US012063928B2

(12) United States Patent
Gandhi et al.

(10) Patent No.: US 12,063,928 B2
(45) Date of Patent: Aug. 20, 2024

(54) ANTIMICROBIAL COMPOSITIONS FOR MODULATION OF FRUIT AND VEGETABLE TISSUE NECROSIS

(71) Applicant: Jeneil Biosurfactant Company, LLC, Saukville, WI (US)

(72) Inventors: Niranjan R. Gandhi, River Hills, WI (US); Victoria Skebba, Cedarburg, WI (US); Gary A. Strobel, Bozeman, MT (US)

(73) Assignee: Jeneil Biosurfactant Company, LLC, Saukville, WI (US)

( * ) Notice: Subject to any disclaimer, the term of this patent is extended or adjusted under 35 U.S.C. 154(b) by 480 days.

(21) Appl. No.: 17/162,261

(22) Filed: Jan. 29, 2021

(65) Prior Publication Data

US 2021/0235696 A1    Aug. 5, 2021

Related U.S. Application Data

(60) Provisional application No. 62/968,545, filed on Jan. 31, 2020.

(51) Int. Cl.
| | | |
|---|---|---|
| *A01N 37/02* | (2006.01) |
| *A01N 3/00* | (2006.01) |
| *A01N 35/04* | (2006.01) |
| *A23B 4/20* | (2006.01) |
| *A23B 7/00* | (2006.01) |
| *A23B 7/154* | (2006.01) |
| *A23B 9/26* | (2006.01) |
| *A23L 2/02* | (2006.01) |
| *A23L 2/44* | (2006.01) |
| *A23L 3/3499* | (2006.01) |
| *A23L 3/3508* | (2006.01) |
| *A23L 3/3517* | (2006.01) |
| *A23L 27/20* | (2016.01) |
| *A23L 27/29* | (2016.01) |

(52) U.S. Cl.
CPC .............. *A01N 37/02* (2013.01); *A01N 3/00* (2013.01); *A01N 35/04* (2013.01); *A23B 4/20* (2013.01); *A23B 7/00* (2013.01); *A23B 7/154* (2013.01); *A23B 9/26* (2013.01); *A23L 2/02* (2013.01); *A23L 2/44* (2013.01); *A23L 3/3499* (2013.01); *A23L 3/3508* (2013.01); *A23L 3/3517* (2013.01); *A23L 27/2028* (2016.08); *A23L 27/204* (2016.08); *A23L 27/2052* (2016.08); *A23L 27/29* (2016.08); *A23V 2002/00* (2013.01)

(58) Field of Classification Search
CPC .......... A01N 37/02; A01N 3/00; A01N 35/04; A23L 27/29; A23L 27/204; A23L 27/2028; A23L 27/2052; A23L 2/02; A23L 2/44; A23L 3/3499; A23L 3/3508; A23L 3/3517; A23B 4/20; A23B 7/00; A23B 7/154; A23B 9/26; A23V 2002/00

USPC ........................................................ 426/335
See application file for complete search history.

(56) References Cited

U.S. PATENT DOCUMENTS

| | | |
|---|---|---|
| 2,711,976 A | 6/1955 | Castellani |
| 2,866,819 A | 12/1958 | Montangna |
| 2,910,368 A | 10/1959 | Melnick et al. |
| 3,119,691 A | 1/1964 | Ludington et al. |
| 3,806,600 A | 4/1974 | Lapore et al. |
| 3,947,570 A | 3/1976 | Pensak et al. |
| 4,349,459 A | 9/1982 | Romero-Sierra et al. |
| 4,356,204 A | 10/1982 | Robach |
| 4,500,517 A | 2/1985 | Luss |
| 4,548,808 A | 10/1985 | Chavkin |
| 4,575,891 A | 3/1986 | Valente |
| 4,581,238 A | 4/1986 | White et al. |
| 4,721,059 A | 1/1988 | Lowe et al. |
| 4,988,576 A | 1/1991 | Lin et al. |
| 5,060,598 A | 10/1991 | Richards |
| 5,176,903 A | 1/1993 | Goldberg et al. |
| 5,273,769 A | 12/1993 | Lajoie et al. |
| 5,455,232 A | 10/1995 | Piljac et al. |
| 5,547,987 A | 8/1996 | Bland et al. |
| 5,670,475 A | 9/1997 | Trinh et al. |
| 5,767,090 A | 6/1998 | Stanghellini et al. |
| 5,783,544 A | 7/1998 | Trinh et al. |
| 5,807,587 A | 9/1998 | Cox et al. |
| 5,866,182 A | 2/1999 | Exner et al. |

(Continued)

FOREIGN PATENT DOCUMENTS

| | | |
|---|---|---|
| CA | 1159271 | 12/1983 |
| CA | 2760150 | 11/2010 |

(Continued)

OTHER PUBLICATIONS

Haque, M.N. et al., "Propionic acid is an alternative to antibiotics in poultry diet", Bang. J. Anim. Sci., 38/1 &2, pp. 115-122, 1 2009.
Maruzzella, J.C., et al., "Effects of Vapors of Aromatic Chemicals on Fungi", Journal of Pharmaceutical Sciences, vol. 50, 8, 665-668, 1960.
Bail, S., et al., "Antimicrobial Activities of Roman Chamomile Oil from France and Its Main Compounds", Journal of Essential Oil Research, vol. 21, 283-286, 2009.

(Continued)

*Primary Examiner* — Brent T O'Hern
(74) *Attorney, Agent, or Firm* — Reinhart Boerner Van Deuren s.c.

(57) ABSTRACT

Disclosed are embodiments of a composition including propanoic acid, a $C_4$ acid salt, and a component selected from a $C_2$-$C_5$ acid ester and a $C_2$-$C_5$ aldehyde and combinations thereof. The composition is provided in an aqueous medium. Each of the propanoic acid and the $C_4$ acid salt are independently present in an amount at least partially sufficient to provide to said composition a pH greater than about 4.4.

25 Claims, No Drawings

(56) References Cited

U.S. PATENT DOCUMENTS

| | | | |
|---|---|---|---|
| 5,968,207 | A | 10/1999 | Li |
| 6,156,362 | A | 12/2000 | Cirigliano et al. |
| 6,187,327 | B1 | 2/2001 | Stack |
| 6,231,840 | B1 | 5/2001 | Buck |
| 6,231,845 | B1 | 5/2001 | Morissey et al. |
| 6,250,511 | B1 | 6/2001 | Kelly |
| 6,287,550 | B1 | 9/2001 | Trinh et al. |
| 6,403,063 | B1 | 6/2002 | Sawyer |
| 6,566,349 | B1 | 5/2003 | Anderson et al. |
| 6,699,825 | B2 | 3/2004 | Rees et al. |
| 6,720,450 | B2 | 4/2004 | Linderman |
| 6,812,217 | B2 | 11/2004 | Hendriks |
| 6,911,338 | B2 | 6/2005 | Strobel et al. |
| 6,960,350 | B2 | 11/2005 | Hanada et al. |
| 7,070,985 | B2 | 7/2006 | Strobel et al. |
| 7,163,708 | B2 | 1/2007 | Dalziel et al. |
| 7,192,575 | B2 | 3/2007 | Ryan et al. |
| 7,267,975 | B2 | 9/2007 | Strobel et al. |
| RE40,050 | E | 2/2008 | Coughlin et al. |
| 7,341,862 | B2 | 3/2008 | Strobel et al. |
| 7,449,130 | B2 | 11/2008 | Lloyd et al. |
| 7,498,050 | B2 | 3/2009 | Kincaid et al. |
| 7,507,429 | B2 | 3/2009 | Man et al. |
| 7,575,744 | B2 | 8/2009 | Doyle et al. |
| 7,659,326 | B2 | 2/2010 | McCarthy |
| 7,863,350 | B2 | 1/2011 | Brander et al. |
| 7,943,565 | B2 | 5/2011 | Kany et al. |
| 7,968,499 | B2 | 6/2011 | Gandhi |
| 7,985,722 | B2 | 7/2011 | Desanto |
| 7,998,278 | B2 | 8/2011 | Hackenberger et al. |
| 8,188,025 | B2 | 5/2012 | Kany et al. |
| 8,728,442 | B2 | 5/2014 | Jimenez et al. |
| 8,728,462 | B2 * | 5/2014 | Gandhi ............ D06M 16/00 435/141 |
| 10,383,332 | B2 * | 8/2019 | Gandhi ............ A01N 37/14 |
| 2002/0098159 | A1 | 7/2002 | Wei et al. |
| 2004/0141955 | A1 | 7/2004 | Strobel et al. |
| 2004/0206697 | A1 | 10/2004 | Strobel et al. |
| 2006/0003057 | A1 | 1/2006 | Kelly et al. |
| 2006/0127347 | A1 | 6/2006 | Strobel et al. |
| 2007/0087094 | A1 | 4/2007 | Schuer |
| 2007/0191292 | A1 | 8/2007 | Gandhi et al. |
| 2008/0213194 | A1 | 9/2008 | Desanto |
| 2010/0272690 | A1 | 10/2010 | Gandhi et al. |
| 2012/0058058 | A1 | 3/2012 | Jimenez et al. |
| 2012/0128843 | A1 | 5/2012 | Richardson et al. |
| 2019/0357532 | A1 * | 11/2019 | Gandhi ............ A23L 3/3508 |
| 2020/0163333 | A1 * | 5/2020 | Gandhi ............ A23B 4/20 |

FOREIGN PATENT DOCUMENTS

| | | |
|---|---|---|
| CN | 1845676 | 10/2006 |
| CN | 102409323 | 4/2012 |
| EP | 1666377 | 2/2009 |
| EP | 1379126 | 10/2009 |
| JP | 2004513153 | 4/2004 |
| JP | 2004321147 | 11/2004 |
| JP | 2012525394 | 10/2012 |
| KR | 1020120047847 | 5/2012 |
| KR | 20130016779 | 2/2013 |
| WO | 199943334 | 9/1999 |
| WO | 2005009360 | 2/2005 |
| WO | 2010129285 | 11/2010 |
| WO | 2010130028 | 11/2010 |
| WO | 2012158448 | 11/2012 |
| WO | 2013059012 | 4/2013 |
| WO | 2013081777 | 6/2013 |
| WO | 2014145828 | 9/2014 |

OTHER PUBLICATIONS

Nagaoka et al., "Antimicrobial activity of sodium citrate against *Streptococcus pneumoniae* and several oral bacteria", Letters in Applied Microbiology 51, 546-551 (Year: 2010).

Friedman, M. et al., "Antibacterial Activities of Phenolic Benzaldehydes and Benzoic Acids against Campylobacter jejuni, *Escherichia coli*, Listeria monocytogenes, and *Salmonella enterica*", J Food Prot, 66(10), 2003, 1811-1821.

Woolford, "The antimicrobial spectra of organic compounds with respect to their potential as hay preservatives", Crass and Forage Science. vol. 39, 75-79. (Year: 1984).

Hamdy M. Abdel-Rahman et al., "Synthesis of [beta]-hydroxypropanoic Acid Derivatives as Potential Anti-inflammatory, Analgesic and Antimicrobial Agents", Arch. Pharm. Life Sci., 339, 2006, 378-387.

Priyanka Kudalkar et al., "Muscodor sutura, a novel endophytic fungus with volatile antibiotic activities", Mycoscience, (2012) 53:319-325.

M.G. Paulraj et al., "Toxicity of Benzaldehyde and Propionic Acid against Immature and Adult Stages of Aedes aegypti and Culex quinquefasciatus", J. Entomol., 8 (6): 539-547, 2011.

European Search Report for 14765584.9 dated Sep. 27, 2016, 27 pages.

B Ouattara et al., "Diffusion of Acetic and Propionic Acids from Chitosan-based Antimicrobial Packaging Films", Journal of Food Science, 2000, 65, 768-773.

S. Quintavalla et al., "Antimicrobial food packaging in meat industry Experimental Station for the Food Preserving Industry", Meat Science, 62, 2002, 373-380.

D.S. Cha et al., "Biopolymer-based antimicrobial packaging: a review", CRC Critical Reviews in Food Science and Nutrition, vol. 44, No. 4, 2004, 223-237.

European Opinion: "Scientific Opinion on the safety and efficacy of propionic acid, sodium propionate, calcium propionate and ammonium propionate for all animal species", the EFSA Journal, vol. 9, No. 12, 2011.

Supplementary Partial European Search Report for 14765584.9 dated Jun. 28, 2016, 9 pages.

Morath, S. et al. "Fungal volatile organic compounds: A review with emphasis on their biotechnological potential", Fungal Biology Reviews, 2012, vol. 26, 73-83.

International Search Report and Written Opinion from International Application No. PCT/2014/030657, Jul. 17, 2014, 14 pages.

Mitchell, A.M. et al. "Volatile antimicrobials from Muscodor crispans, a novel endophytic fungus," Microbiology, vol. 156, No. 1, Jan. 1, 2010, pp. 270-277.

Prange, Robert K. et al. Perspectives on postharvest biopesticides and storage technologies for organic product, HortScience, vol. 41 (2), Apr. 1, 2006, pp. 301-303.

Supplementary European Search Report, Apr. 24, 2013.

Stinson et al., "An endophytic *Gliocladium* sp. of Eucryphia cordifolia producing selective volatile antimicrobial compounds", Plant Science 165 (2003) 913-922.

Atmosukarto I, et al., "Isolation and characterization of Muscodor albus 1-41.3s, a volatile antibiotic producing fungus", Plant science 169 (2005) 854-861.

Strobel, GA, et al., "Volatile antimicrobials from Muscodor albus, a novel endophytic fungus", Microbiology (2001), 147, 2943-2950.

Mitchell, A.M. et al. "Muscodor Crispans, A Novel Endophyte from Ananassoides in the Bolivian Amazon," Fungal Diversity, 2008, vol. 31, pp. 37-43. See Abstract; fig. 1-3.

Ezra, D. et al. "New Endophytic Isolates of Muscodor Albus, a Volatile-Antibiotic-Producing Fungus," Microbiology, 2004, vol. 150, pp. 4023-4031. See Abstract; examples 1-6; tables 1 & 2.

Strobel, G. "Harnessing Endophytes for Industrial Microbiology," Current Opinion in Microbiology, 2006, vol. 9, pp. 240-244. See Abstract; fig. 1.

Ezra, D. et al. "Effect of Substrate on the Bioactivity of Volatile Antimicrobials Produced by Muscodor Albus," Plant Science, 2003, vol. 165, pp. 1229-1238. See Abstract; tables 1-6.

Mani-Lopez, E. et al., "Organic Acids as Antimicrobials to Control *Salmonella* in Meat and Poultry Products", Food Research International, vol. 45, No. 2, Mar. 1, 2012, pp. 713-721.

1-Butanol, 3-methyl-, acetate. material measurement laboratory. NIST. 2011. p. 1-2.

Propionic acid. Information sheet from Technical Evaluation Report for the USDA National Organic Program. Sep. 3, 2008. p. 1-7.

(56) References Cited

OTHER PUBLICATIONS

Final Report on the Safety Assessment of Benzaldehyde. International Journal of Toxicology. 25(Suppl. 1): 11-27, 2006.
Sauceda, E.N.R., Use of Natural Antimicrobial Agents in the Preservation of Fruits and Vegetables, Ra Ximhai vol. 7, No. 2, Jan.-Apr. 2011.

* cited by examiner

ANTIMICROBIAL COMPOSITIONS FOR MODULATION OF FRUIT AND VEGETABLE TISSUE NECROSIS

CROSS-REFERENCE TO RELATED PATENT APPLICATIONS

This claims priority to U.S. Provisional Application No. 62/968,545, filed Jan. 31, 2020, which is incorporated herein by reference in its entirety.

FIELD OF THE INVENTION

This invention generally relates to an antimicrobial composition and in particular to an antimicrobial composition in which the ingredients are naturally derived and generally recognized as safe.

BACKGROUND OF THE INVENTION

The agricultural industry faces many quality control and production issues related to microbial contamination and disease. Frequent reports of foodborne illness are traced to contaminated (e.g., *Salmonella* sp. or *E. coli*) fruits or vegetables, invariably followed by costly recalls, resulting in significant economic and personal injury, if not death. While such outbreaks may elicit public attention, they are the exception. A more pervasive, but under-appreciated problem is the prevalence of post-harvest disease. Conservatively, about 24% of harvested crops have been estimated by the United States Department of Agriculture (USDA) as lost to disease and spoilage. The percentage is most-likely higher, considering losses during transport and processing, at market and up to end-point preparation also occur, but are not reported. Post-harvest losses are even greater in less developed countries for lack of proper storage. Worldwide, overall losses due to spoilage and disease may be up to be 50% or more. (See, e.g., Wilson, C. and Wisniewski, M., Annu. Rev. Phytopathol, 1989, 27:425-41, and subsequent USDA publications.)

Much progress has been made toward identification and development of biocides for controlling various molds, plant diseases and the like. However, most commercial biocides in use are compounds which are classified as carcinogens or are toxic to wildlife and other non-target species. For example, methyl bromide is widely used as a soil fumigant and in the post-harvest treatment of microbial infections. Human toxicity and deleterious environmental effects will ultimately result in discontinued use of methyl bromide and various other synthetic biocides.

As a result, efforts have been directed to the identification and development of natural or biomimetic compositions demonstrating antimicrobial properties. One such approach relates to endophytes and associated volatile by products. Endophytes are defined in the art as microorganisms residing in the interstitial spaces of living plant tissue, but are generally not considered to be parasitic. In particular, endophytes found in conjunction with rain forest plants have generated considerable interest for reasons relating to the antibiotic character of their volatile by products. Several members of the Muscodor genus (i.e., *M. albus, M. roseus* and *M. vitigenus*) have been shown to produce volatile by products exhibiting antibiotic or insecticidal character, but the respective by product of each species includes various naphthalene and/or azulene derivatives. Such compounds, together with other by product components, can be toxic or otherwise unhealthy, and the corresponding mixtures are considered unacceptable for various end use applications such as the preservation of fruits and vegetables.

More recently, it has been determined that compositions biomimetic to the volatile by product of *M. crispans* are antimicrobial without such naphthalene/azulene components. However, various formulations and applications of such compositions can be injurious to certain fruit and vegetable tissues. Accordingly, there remains an on going search in the art to develop biomimetic compositions that are safe for human use and exhibit good antimicrobial properties without compromising fruit/vegetable quality.

SUMMARY OF THE INVENTION

In light of the forgoing, it is an object of the present invention to provide antimicrobial compositions and/or methods for their use, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to inhibit, reduce, affect or otherwise modulate induction of fruit and vegetable tissue injury associated with use of antimicrobial compositions.

It can be another object of the present invention to adjust and and/or control the pH of such a composition to provide good antimicrobial effect under practical end-use applications.

It can be another object of the present invention to use relative amounts of propanoic acid and a $C_4$-$C_6$ acid salt in such an antimicrobial composition to affect pH and/or modulate fruit/vegetable tissue necrosis.

It can also be an object of the present invention, alone or in conjunction with one or more of the preceding objectives, to provide such compositions and related methods to reduce, inhibit, affect and/or modulate microbial activity regardless of fruit or vegetable substrate or corresponding juice, nectar or concentrate.

Other objects, features, benefits and advantages of the present invention will be apparent from this summary and the following descriptions of certain embodiments, and will be readily apparent to those skilled in the art having knowledge of various antimicrobial compositions and related methods. Such objects, features, benefits and advantages will be apparent from the above as taken into conjunction with the accompanying examples, data, figures and all reasonable inferences to be drawn therefrom, alone or with consideration of any reference incorporated herein.

The present invention can comprise compositions which can comprise propanoic acid, with $C_4$ acid salt and a component selected from a $C_2$-$C_5$ acid ester and a $C_2$-$C_8$ aldehyde and combinations thereof. Such compositions can be present in an aqueous medium wherein each of the propanoic acid and the $C_4$ acid salt can be independently in an amount at least partially sufficient to provide such a composition the pH greater than about 4.4. Such compositions can also be preferably considered with propanoic acid present at a ratio of about 4:3 (v/w) to about 1:6 (v/w) with respect to a salt of isobutyric acid. In preferred embodiments, an acid salt can be selected from salts of isobutyric acid and combinations thereof. More preferably, such a salt can be selected from potassium and ammonium salts of isobutyric acid. In embodiments, the $C_4$ salt may be added to the antimicrobial composition in its salt form. In other embodiments, the $C_4$ salt may be added to the antimicrobial composition in the form of components that form the salt in solution. For example, to form the $C_4$ salt of potassium isobutyrate, potassium hydroxide and isobutyric acid may be combined to form potassium isobutyrate salt in the antimicrobial composition.

In preferred embodiments, an ester can be selected from esters of a $C_4$ or $C_5$ acid and combinations thereof. More preferably, such an ester can be selected from esters of isobutyric acid, isovaleric acid, and combinations thereof. Further, in a preferred embodiment, the ester can be selected from esters of a $C_4$ or $C_5$ alcohol. Such alcohols can be selected from 1-butanol, isobutanol, 2-butanol, tert-butanol, 1-pentanol, isoamyl alcohol, 2-methyl-1-butanol, neopentyl alcohol, 2-pentanol, 3-methyl-2-butanol, 3-pentanol, and tert-amyl alcohol. Particularly preferred alcohols for the formation of the acid ester with the $C_4$ or $C_5$ acid include isobutanol and isoamyl alcohol. Without limitation, particularly preferred esters can be isobutyl isobutyrate and isobutyl isovalerate.

In preferred embodiments, such an aldehyde can be benzaldehyde. In conjunction therewith, such an acid salt can preferably be selected from salts of isobutyric acid and combinations thereof. In particular, without limitation, such a preferred salt can be selected from potassium and ammonium salts of isobutyric acid. Further, without limitation, a preferred ester can be selected from esters of isobutyric acid, isovaleric acid, and combinations thereof, such as but not limited to isobutyl isobutyrate and isobutyl isovalerate. Likewise, in preferred embodiments, an acid salt can be potassium isobutyrate. More preferably, the pH of such a composition can be about 4.7 to about 5.4, and/or propanoic acid can be present at a ratio of about 3:4 (v/w) to about 2:5 (v/w) with respect to such a salt. Regardless, such a composition can be applied preferably to a substrate selected from fruits, nuts, vegetables and seeds.

The present invention can comprise compositions which can comprise propanoic acid, a salt of isobutyric acid of the sort provided above or described elsewhere herein, a $C_2$-$C_5$ acid ester of the sort provided above and described elsewhere herein and a flavor component selected from benzaldehyde, octyl acetate, gamma-decalactone and methyl anthranilate. Such compositions can be in an aqueous medium, with propanoic acid present a ratio of about 4:3 (v/w) to about 1:6 (v/w) with respect to a salt of isobutyric acid. Preferably, such a flavor component can be benzyldehyde, and such a composition can be applied to cherries or a composition selected from cherry juices, cherry nectars and cherry concentrates; such a flavor component can be octyl acetate, and such a composition can be applied to an orange or a composition selected from orange juices, orange nectars and orange concentrates; such a flavor component can be gamma-decalactone, and such a composition can be applied to peaches or a composition selected from peach juices, peach nectars and peach concentrates; or such a flavor component can be methyl anthranilate, and such a composition can be applied to grapes or a composition selected from grape juices, grape nectars and grape concentrates. Preferably, such a composition can be present at a concentration of about 0.06 vol. % to about 0.1 vol. %. Regardless, such a flavor component can preferably be about 0.005 vol. % to about 0.2 vol. % of such a composition.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

DETAILED DESCRIPTION

Preferably, compositions of the sort described above can be incorporated into fruit/vegetable juices, fruit/vegetable nectars, fruit/vegetable concentrates or combinations thereof, or applied to a substrate selected from fruits, vegetables, nuts and seeds. Regardless, one or more of such compositions can be in an amount at least partially sufficient to modulate microbial activity. Likewise, in preferred embodiments, one or more such compositions can be used in conjunction with a method of modulating microbial activity on fruits and vegetables and/or to modulate fruit and vegetable tissue necrosis. Such preferred embodiments are illustrated by the following non-limiting examples and data relating to such preferred compositions and/or methods of the present invention. In comparison with the prior art, the present compositions and methods provide results and data which are surprising, unexpected and contrary thereto. While the utility of this invention is illustrated through the use of several preferred compositions and preferred compounds which can be used therewith, it will be understood by those skilled in the art that comparable results are obtainable with various other preferred compositions and component compounds, as are commensurate with the scope of this invention.

Example 1

Various compositions of the present invention were shown to have antimicrobial effect without tissue necrosis when applied to a range of fruits and vegetables sourced from local retailers and growers. With reference to the comparative tests of the following examples:

Control A: water;

Composition B was prepared with 0.2 ml propanoic acid, 0.5 g of potassium isobutyrate, 0.2 ml of isobutyl isobutyrate, and 0.2 ml of benzaldehyde (v:w:v:v) then diluted to 100 ml to provide a 1% solution (pH of about 5.5);

Composition C was prepared with 0.1 ml propanoic acid, 0.6 g of potassium isobutyrate, 0.2 ml of isobutyl isobutyrate and 0.2 ml of benzaldehyde (v:w:v:v) then diluted to 100 ml to provide 1% solution (pH of about 6.0); and Composition D: a 1% solution of a thirteen-component composition of Table 10 of U.S. Pat. No. 8,728,462. For each of Compositions B and C, as well as various other compositions of this invention, isobutyl isobutyrate is a non-limiting example of a $C_2$-$C_5$ acid ester and benzaldehyde is a non-limiting example of a $C_2$-$C_8$ aldehyde.

Example 1a

All grapes used were of the Thompson Seedless variety, and all used in the treatments were still attached to the stem. In each treatment, grape specimens were placed in a sealed plastic container box dimensioned about 6×6×2" with a piece of Whatman no. 1 filter paper on the bottom of the box, wetted as described, below, for each. The boxes were incubated at room temperature (approx. 23° C.) for one week, then assessed for decay, fungal growth and any spotting or discoloration based on the color and disposition of the skin of normal grapes.

No fungal inoculum was used in this study. Any observed degradation or decay was the result of only the normal flora present on the grapes. Digital images (not shown, but available) were taken of the grapes used in each treatment for color, size, any deformities and necrotic spots, as a basis for visual comparison.

TABLE 1

Comparative Grape Protection.

| | |
|---|---|
| Treatment 1 | Several grape clusters were placed for 5 minutes in a 1% solution of Composition B and then rinsed with distilled water. The paper was wetted with distilled water during incubation for 1 week at room temperature. |
| Treatment 2 | The grapes were placed into Control A water for 5 minutes and then rinsed with water. |
| Treatment 3 | The grapes were sprayed thoroughly with Composition C but not dried, then placed in box over the paper wetted with C. |
| Treatment 4 | The grapes were sprayed thoroughly with C, dried then incubated over paper wetted with water. |
| Treatment 5 | The grapes were sprayed with B, dried then incubated over water on the paper. |
| Treatment 6 | The grapes were sprayed with water, dried then incubated over water on the paper. |

Under the conditions used, neither Compositions B nor C resulted in any noticeable spotting or necrosis of the grape tissues.

More specifically, dipping the grapes in Composition B for a 5 minute exposure followed by incubation over a water-saturated Whatman filter paper for 1 week provided complete protection of the grapes with no decay, fungal growth, necrosis or adverse effect on the grape epidermis. (See Treatment 1). Likewise, a spray with Composition C without drying and incubation over the paper wetted with C also resulted in protection of the grapes with no necrotic spotting (see Treatment 3). (Upon completion of Treatments 1 and 3, the grapes retained texture.) However, spraying followed by drying with either C (treatment 4) or B (treatment 5) was less effective, as incubation over filter paper wetted with either C or B, respectively, resulted in some decay. The Control A fruits (treated with water), in all cases, showed decay (Treatments 2 and 6).

Based on the foregoing, both Compositions B and C can be used for protection of grapes. Dipping for 5 minutes or more followed by a rinse is an excellent protocol for disease control. Likewise, dipping or spraying the fruit and keeping it in contact with vapor of the volatile composition is also effective. There was no necrosis resulting from the treatments and no evidence of any surface spotting.

Example 1b

Following a procedure in accordance with the general procedure of example 1a, strawberries were placed in a sealed box for 1 week at room temperature. Beforehand, each berry of 5 was sprayed with about 0.1 ml of Control A or test Composition B or D, and the Whatman paper in the bottom of each plastic container was dampened with 0.5 ml of each composition, respectively.

Composition B, as described above, does not cause any acid induced necrotic spots on the fruit. It also serves as a protectant to the fruit from decay-causing organisms as evidenced in digital images (not shown, but available). No decay or fungal growth was observed; there was no growth on the filter papers. Conversely, after 1 week of incubation, fruit treated with Control A rapidly showed decay, whereas with Composition D there was some decay. (The decay organisms are those intrinsic to each fruit.) Through results of this and other examples, herein, it was suspected that the relatively low pH of Composition D causes some tissue breakdown and necrosis which may lead to subsequent fungal infection.

Example 1c

Following a procedure in accordance with the general protocol of example 1a, treated pears were placed in a sealed container for 10 days at room temperature.

TABLE 2

| | |
|---|---|
| Treatment 1 | Carefully selected pears were individually rinsed in Composition B for a 10 min exposure |
| Treatment 2 | Carefully selected pears were individually rinsed in Composition C for a 10 min exposure |
| Treatment 3 | Carefully selected pears were exposed to a Control A water rinse for 10 min |

After the 10-day incubation period, the pears were examined for disease symptoms as well as necrotic spotting: no necrotic flecks or spotting resulted from treatment with either Composition B or C. No disease symptoms developed in either the control or the treated pears. (Digital images are available, but not shown.)

Example 1d

Following a procedure in accordance with the general procedure of example 1a, cherries were placed in sealed boxes for 1 week at room temperature. (There was no fungal inoculum used in the experiment, only natural flora naturally occurring on the cherry.) Each of five cherries in each box was sprayed with about 0.1 ml of Control A or one of Compositions B and C, and the Whatman papers in the bottom of the plastic containers were dampened with 0.5 ml of each respective control or composition.

Neither Composition B nor C caused any acid induced necrotic spots or lesions one week and more after spraying. Also, each of Compositions B and C served as a protectant to the fruit: no fungal growth was observed on the fruit or on the filter paper holding the fruit. In contrast, treatment with water (Control A) resulted in rapid decay and almost total decay within a few days. (Digital images are available, but not shown.)

Whereas the fruit of this example was sprayed with one of the Compositions B and C, this and other fruits and vegetables can also be dipped/rinsed in a composition of this invention-whether at an end-point retail outlet or at any point from harvest, during storage and/or through distribution and sale, regardless of mode of application.

Example 1e

Following a procedure in accordance with the general procedure of example 1a, raspberries were placed in sealed boxes for 1 week at room temperature. (There was no fungal inoculum used in the experiment, only natural flora naturally occurring on the raspberries.) Each raspberry in each box was sprayed with about 0.05 ml of Control A or one of Compositions B and C, and the Whatman papers in the bottom of the plastic containers were dampened with each respective control or composition.

Again, Compositions B and C do not cause acid induced spots or lesions one week and more after spraying. Also, each of B and C served as a protectant to the fruit (i.e., no decay or fungal growth). Further, no fungal growth was observed on the filter paper holding the fruit. In contrast, treatment with Control A resulted in rapid and almost total decay within a few days. (Again, contrasting digital images are available, but not shown.)

Example 1f

Following a procedure in accordance with the general procedure of example 1a, black raspberries were placed in a sealed box for 1 week at room temperature. Again, no fungal inoculum was used; this study involved only flora naturally present on the berries.

The berries were placed in a plastic bag in the presence of Composition B and kept there for 5 minutes, to simulate a rinse or a soaking activity, then were placed on Whatman paper in the bottom of a plastic container. Another bunch of berries was treated likewise with water (Control A) for 5 minutes. Each plastic container was sealed, with the respective bunch of berries incubated for 1 week at 23° C.

Composition B, as described above, did not cause necrotic spots up to one week after treatment. Only traces of fungal growth were observed on one or two berries, with none on the filter paper. In marked contrast, berries treated with Control A (water) showed rapid and massive fungal decay over the incubation period. (Digital images are available, but not shown.)

Notwithstanding the treatment of this example, the compositions of this invention can be used as a dip, a spray, or as may be suitable for a particular application. For instance, such compositions can be used as a wipe or spray over cheese wheels or on smaller portions thereof for storage, sale and/or distribution.

Example 1g

Following a procedure in accordance with the general procedure of example 1a, cucumbers were placed in a sealed box for 7 days at room temperature. (No fungal inoculum used in this study—only flora naturally present on the cucumbers.)

Each of three cucumbers was sprayed with about 0.5 ml of either Composition B or Control A, and the Whatman papers on the bottom of each plastic container were dampened with 0.5 ml of each of A or B, respectively. After 7 days, both the control cucumbers and those treated with Composition B showed some signs of decay.

To improve application and enhance antimicrobial effect, another group of three cucumbers was soaked in Composition B for 5 minutes, and another group of three cucumbers was similarly treated with Control A. Whatman papers were prepared, for each group, as before. Each plastic container was sealed and incubated for 7 days at 23° C.

Composition B did not induce necrotic spots on the fruit for up to 7 days and more after treatment. Further, B served as a protectant to the fruit: none showed signs of decay or incipient rot. There was no fungal growth on any fruit in the group treated with B. Likewise, there was no fungal growth on the filter paper holding the fruit. In contrast, after 7 days, one of the control fruits was totally decayed, and the other two showed signs of initial decay. (Digital images are available, but not shown.)

Example 1h

Following a procedure in accordance with the general procedure of example 1a, mangoes were placed in a sealed box for 10 days at room temperature. (Again, no fungal inoculum was used.)

Each mango in one group of three was sprayed with about 0.5 ml of Composition B, and the Whatman papers in the bottom of the plastic container were dampened with 0.5 ml of B. Another group of three (and Whatman papers) were likewise treated with Composition C. Another group of three (and Whatman papers) was treated in the same manner with Control A (water). Each plastic container was sealed and incubated for 10 days at 23° C.

Neither Composition B nor C caused any acid-induced spots on the fruit up to 10 days and more after spraying. Also, both B and C served as a protectant, as there was no decay and no fungal growth on the respective fruit or papers holding the fruit. In contrast, one of the fruit treated with Control A was totally decayed, and initial decay was observed in the other two. (Black spots on the fruit of all three groups were due to incipient decay-causing fungi on the fruit when initially procured, and these spots began to spread in number and size during incubation of the fruit in the Control A container. There was no spreading in size or number of dark spots on the mangoes treated with either B or C. Again, digital images are available, but not shown.)

Example 1i

Following a procedure in accordance with the general procedure of example 1a, blueberries were placed in a sealed box for 1 week at room temperature. (No fungal inoculum was used).

A test group of blueberries was sprayed with Composition B, then placed on Whatman no 1 paper in the bottom of a plastic box. The paper absorbed the excess solution. Another group of berries was treated in the same manner with Composition C. Further, a third group was treated likewise with Control A. Each plastic container was sealed, with the respective berries incubated for 10 days at 23° C.

Neither Composition B nor C caused acid induced necrotic spots up to one week and more after spraying. However, some berries sprayed with C did have some decay, and several berries sprayed with B showed signs of decay. In contrast, the group treated with Control A exhibited almost total decay within a few days. (Digital images are available, but not shown.)

To improve application and enhance antimicrobial effect, berries from the same retail supply were used for a second study: Groups of berries were placed in a rinse of either Composition B, Composition C or Control A for 5 min then placed and sealed in boxes, as before. After 10 days, about 90% of the control fruits were colonized by fungi. Berries treated with C also had significant decay (about 50%). However, of those dipped/rinsed with B only 2-4 berries showed any decay. (As before, necrotic spots were not observed.)

Example 1j

Following a procedure in accordance with the general procedure of example 1a, broccoli, specifically select smaller cuttings (florets) of the floral head, was placed in a sealed box for 7 days at room temperature. (No fungal inoculum was used in this study.)

A group of florets was sprayed with about 0.5 ml of composition B, and Whatman papers on the bottom of a plastic container were dampened with B. Control A (water) was sprayed on a second grouping of florets and used to dampen underlying papers. Each container was sealed and incubated for 7 days at 23° C., with each respective grouping then evaluated for decay.

Composition B did not cause acid-induced necrotic spots on the florets 7 days and more after spraying. Also, the florets remained green throughout the test period. Also, B served as a protectant: Some slight fungal infections were noted in at least two florets, but not to the same degree as the control that had noticeable infection in almost every floret segment. In addition, the control florets faded to a light green-yellow appearance. (Digital images are available, but not shown.) Further, the florets treated with Control A showed decay around the floret base, which in many cases appeared blackened; and, in some cases, fungal hyphae were noticed on the florets. There was also some direct decay of the floret heads.

Example 1k

It is well known that, after picking and during storage, avocados begin to show decay at the top or stem end of the fruit. Anthracnose disease (*Colletotrichum gloeosporioides*) may be the cause of such symptoms. However, it is known that the fungi *Dothiorella dominicana*, *Phomopsis* spp., *Botryodiplodia theobromae* and *Lasiodiplodia theobromae* can also cause avocado stem end rot. The fruit stem first becomes infected during processes involved in fruit development and ripening. A dark rot develops from the stem end as a fruit ripens after harvest. Eventually the entire fruit is subject to rot or decay. The infectious fungi are endophytic, and all are observed to have a whitish mycelium. It was thought that an antifungal treatment to inhibit and/or kill fungi in the stem end of the fruit would prevent eventual fruit decay.

Following a procedure in accordance with the general procedure of example 1a, three avocados were dipped in Control A water for 10 minutes. Another group of three avocados was dipped in composition B for 10 minutes. For each group, Whatman papers were placed on the bottom of a plastic container and dampened, respectively, with A or B. The plastic containers were sealed for 8 days at room temperature, with the fruit photographed at that time. There was no fungal inoculum used in the experiment-only flora naturally occurring on the pieces of the fruit and the stem attached to the fruit. (See preceding discussion.)

Composition B did not cause acid induced necrotic spots on the avocado fruits 8 days after treatment. This treatment group had only minor fungal development on the stem ends, with just one fruit showing some stem end decay. There were no white mycelia on the stem ends of the treated fruit, but some slight *Penicillium* (green) development on one fruit. All treated fruits were firm. In contrast, a whitish mycelial decay was noted in stem ends of two out of the three control fruits, with massive decay in the underlying tissues of those control fruits. (Digital images are available, but not shown.)

It is to be noted that the treatment with a 10 min dip in Composition B was definitely effective in disease control. A longer dip treatment may be totally effective. Further improvements can result with use of a wetting agent (e.g., a rhamnolipid surfactant or another food grade wetting agent) in the treatment solution, whether the fruit is dipped or sprayed. (See, e.g., preceding rhamnolipid examples.) Regardless, treatment at the time of harvest will allow the solution (e.g., Composition B) to have better access to green, fresh stem ends (as opposed to dried and shrunken stems), to enhance disease control.

Example 1l

It is well known that bell peppers, after picking and storage, begin to show decay at the top or stem end of the fruit or on bruises, cuts and scrapes of the epidermis. Once this process begins the entire fruit is subject to rot or decay. This same phenomenon occurs with other peppers, such as mini-sweet and jalapeno peppers.

Following a procedure in accordance with the general procedure of example 1a, three peppers (red, yellow and orange) were dipped in water (Control A) for 10 minutes, as a control. A second group of three was dipped in Composition B for 10 minutes. For each group, Whatman papers were placed in the bottom of a plastic container and dampened, respectively, with either A or B. The plastic containers were sealed at room temperature and photographed seven days later. (There was no fungal inoculum used in the experiment-only flora naturally occurring on the pieces of the fruit and the stem attached to the fruit.)

Composition B did not cause any acid induced spots on the bell pepper fruits 7 days after treatment. The treatment group had only one stem end showing evidence of fungal growth, but it was minor and had not entered the fruit. All treated fruits were firm. In contrast, decay was noted in the stem end of each control pepper, with massive decay in the tissues of the orange fruit and complete collapse of the fruit. (Digital images are available, but not shown.)

Composition B may be most effective if the fruits are first rinsed with water then placed in Composition B for 10 minutes, or longer for improved results. This might be done immediately after harvest so that the healthy tissues are still accessible to Composition B, as the stem end of each fruit will not have had time to dry up and protect the spores and hyphae of pathogenic fungi buried in dried inaccessible tissues. If the tissue is fresh, Composition B may have better access to these living tissues. In addition, a food grade surfactant/wetting agent may further help the access of Composition B to tissue sites housing fungi. Furthermore, treating newly harvested fruit will also have the added advantage of allowing any scrapes, scratches, bruises or wounds to have an immediate access to the protective effects of Composition B.

Example 1m

Following a procedure in accordance with the general procedure of example 1a, a group of six mini-sweet peppers was dipped in water (Control A) for 10 minutes as a control. A second group of six was dipped in Composition B for 10 minutes. For each group, Whatman papers were placed in the bottom of a plastic container and dampened with, respectfully, either Control A or Composition B. The plastic containers were sealed, kept at room temperature and examined seven days later. (There was no fungal inoculum used in the experiment-only flora naturally occurring on the pieces of the fruit and the stem attached to the fruit.)

Composition B did not cause any acid induced spots on the mini sweet pepper fruits 7 days after treatment. The treatment group had only one stem end showing some fungal growth, but it was minor and had not entered the fruit. Two fruits had some minor decay on previously wounded areas in the body of the fruit, but the decay was superficial. All treated with Composition B were firm. In contrast, decay was noted in the top end and stem of each control fruit, with additional decay in the tissues in at least three of the fruits. One of these three had completely rotted, and was believed due to *Geotrichum candida*. (Digital images are available, but not shown.)

Upon opening the control fruit container, there was a strong odor of totally decayed pepper fruit: It was rancid and obnoxious. After 7 days, the treated fruit smelled fresh, without such odors.

Again, Composition B may be most effective if the fruits are first rinsed with water, then placed in Composition B for 10 minutes or longer. This should be done immediately after harvest so that the healthy tissues are still accessible to Composition B, as the stem end of each fruit will not have had time to dry up and protect the spores and hyphae of pathogenic fungi buried in dried inaccessible tissues. If the tissue is fresh, Composition B may have better access to these living tissues. In addition, a food grade wetting agent/surfactant further help the access of Composition B to the tissue sites housing fungi. Furthermore, treating newly harvested fruit will also have the added advantage of allowing any scrapes, scratches, bruises or wounds to have an immediate access to the protective effects of Composition B.

Example 1n

Following a procedure in accordance with the general procedure of example 1a, a group of five jalapeno peppers was dipped in water (Control A) for 5 minutes. A second group of five was dipped in Composition B for 5 minutes. For each group, Whatman papers were placed in the bottom of a plastic container and dampened with, respectively, either Control A or Composition B. The plastic containers were sealed, kept at room temperature and examined eight days later. (There was no fungal inoculum used in the experiment-only natural flora naturally occurring on the pieces of the fruit and the stem attached to the fruit.)

Composition B did not cause any acid induced spots on the jalapeno fruits 8 days after treatment. In the treatment group, two stem ends exhibited some fungal growth, but it was minor and had not entered the fruit. Two fruits had some minor decay showing on previously wounded areas in the body of the fruit, but it was superficial. All treated peppers were firm. In contrast, decay was noted in the top end and stem of each control fruit, with additional decay in the tissues of each fruit. In three cases the entire fruit rotted. The majority of the fungal infections in the control group was believed caused by *Geotrichum candidum*. (Digital images are available, but not shown.)

It is to be noted that spray application of Composition B was not especially effective. However, as demonstrated, a 5 min dip in B was definitely effective in disease control. Longer treatment times may be totally effective.

Composition B may be most effective if the fruits are first rinsed with water then placed in Composition B, as the stem end of each fruit will not have had time to dry up and protect the spores and hyphae of pathogenic fungi buried in dried inaccessible tissues. If the tissue is fresh, Composition B may have better access to these living tissues. In addition, a food grade wetting agent/surfactant may further help the access of Composition B to tissue sites housing fungi. Furthermore, treating newly harvested fruit will also have the added advantage of allowing any scrapes, scratches, bruises or wounds to have an immediate access to the protective effects of Composition B.

Example 1o

Following a procedure in accordance with the general procedure of example 1a, sweet potatoes (2) were dipped in water (Control A) for 15 minutes. Another group of two potatoes was dipped in Composition B also for 15 minutes, as a rinse. Each group was placed on Whatman papers, dampened with either Control A or Composition B, in the bottom of a plastic container. The plastic containers were sealed at room temperature for 7 days. (There was no fungal inoculum used in the experiment-only flora naturally occurring on the pieces of the fruit and the stem attached to the fruit.)

Composition B did not induce necrotic spots on the sweet potatoes 7 days after treatment. However, decaying fungi developed in both the treated and control potatoes. (Digital images area available, but not shown.) It is believed that the fungi had earlier infected and penetrated the hard potato exterior tissue and was not affected by surface treatment with Composition B.

In a slight departure from the preceding, two mature eggplant fruits were sprayed (calyx end) with Composition B and incubated for 1 week at room temperature. The control fruits (2) were sprayed with water (Control A), sealed and likewise incubated. After this period, there were appreciable differences between the treated and control fruits, with the treated fruits having much less fungal growth on the calyx end of each. (Again, digital images are available, but not shown.)

Example 1p

Following a procedure in accordance with the general procedure of example 1a, each mid-size tomato in a group of six was sprayed with about 0.25 ml of Composition B. The control fruits (6) were sprayed with water (Control A). Each group was placed in a sealed plastic box over filter paper, dampened with either Control A or Composition B, for 10 days at room temperature.

Composition B did not cause any acid-induced necrotic spots on the tomato fruits and provided complete protection from fungal and bacterial decay. In contrast, severe rot developed on the control fruits. (Digital images are available, but not shown.)

It would appear that Composition B could be applied at the time of harvest, when the fruit is packed or upon arriving at a shipping destination, and should be considered as an important tool for disease protection.

Example 1q

Following a procedure in accordance with the general procedure of example 1a, each large tomato in a group of five was sprayed with about 0.25 ml of Composition B. Another group of five large fruits were sprayed with water (Control A). Each group was, respectively, placed in a sealed plastic box over filter paper, dampened with either Control A or Composition B, for 7 days at room temperature. (There was no fungal inoculum used in the experiment-only natural flora naturally occurring on the fruits.)

Composition B did not cause any acid induced necrotic spots on the tomato fruits, and only one fruit showed surface tissue decay. In contrast, severe fungal growth and rot developed on each of the control fruits.

It is believed that with larger fruit, the naturally-occurring, spoiling fungi were afforded more time for penetration and infection of surface and calyx tissues, rendering subsequent treatment less effective. Earlier application, on smaller fruits, and/or use of a surfactant (e.g., a rhamnolipid) can enhance antimicrobial effect.

Example 1r

Following a procedure in accordance with the general procedure of example 1a, a group of cauliflower head cuttings (florets) was sprayed with about 0.5 ml of Composition B, and Whatman papers in the bottom of a plastic container were dampened with B. A water control (Control A) was sprayed onto a grouping of cauliflower florets and used to dampen filter papers at the bottom of another plastic container. After 10 days sealed at room temperature, each group of florets was evaluated for decay. (There was no fungal or bacterial inoculum used in the experiment-only flora naturally occurring on the pieces of the floral head.)

Composition B did not cause any acid induced spots on the cauliflowers, at 10 days after spraying. Also, the florets remained strikingly white throughout the test period, and there was only a small amount of water spotting of the florets. The treated cauliflower florets remained intact and crisp. In contrast, the control cauliflower was decayed throughout and appeared as water-soaked, with a soft rot throughout the inflorescence. There was also strong yellowish discoloration on the surface. Interestingly, the entire cauliflower lost its integrity, as mere finger pressure resulted in the complete collapse of the tissues. The smell of the control container was absolutely unbearable. (Digital images are available, but not shown.)

While Composition B was applied as a spray, it can be introduced in other ways, such as by soaking shortly after harvesting. This application may be easier and less expensive, and perhaps more thorough as Composition B may more effectively penetrate the tissues.

Example 1s

Following a procedure in accordance with the general procedure of example 1a, Brussels sprouts (8) were dipped in water (Control A) for 5 minutes. Likewise, sprouts (7) were dipped in Composition B for 5 minutes. In both cases the fruits were placed in a sealed box for 7 days at room temperature. Whatman papers in the bottom of each plastic container were dampened with either Control A or Composition B. (There was no fungal inoculum used in the experiment-only microbial flora naturally occurring on the sprouts were relied upon as infectious agents.)

Composition B did not induce necrotic spots on the Brussels sprouts 7 days after treatment. The treatment group had no apparent rotted or infected sprouts. The treated sprouts appeared quite like they did a week before the time of treatment. In contrast, decay was noted in the tops ends (stems) of each control sprouts, with additional decay in some of the tissues in many of the sprouts. In one case there was complete decay of the entire sprout.

The sprouts were also spray-treated, but with results not as successful as the dip treatment discussed above. (Digital images are available, but not shown.)

This sprout study illustrates that with certain fruits and vegetables a brief soak in Composition B can be more effective that a simple spray treatment. However, alternate applications can be considered. Nonetheless, wetting agents may also prove useful in some cases.

Example 1t

Following a procedure in accordance with the general procedure of example 1a, each of a group of Bing cherries was sprayed with about 0.1 ml of Composition B, and Whatman papers in the bottom of a plastic container were dampened with 0.5 ml of Composition B. As a control, each of another group of Bing cherries was sprayed with water (Control A). Each plastic container was sealed and incubated for 1 week at 23° C. (No fungal inoculum was used—only the natural flora of the cherries were relied upon as a source of infectious agents.)

Composition B did not induce necrotic spots on the fruit up to one week and more after spraying. Also, Composition B served as a protectant to the fruit, and no decay was observed. In contrast, the control fruit were almost totally decayed within a few days. (Digital images are available, but not shown.)

Example 1u

Given the positive results of previous examples, this invention was applied to a vegetable crop of a plant family not previously tested—leguminosae, represented by regular garden green beans. Following a procedure in accordance with the general procedure of example 1a, about 20 beans were treated by spray with a few ml of Composition B. Control beans (also about 20) were sprayed with deionized water (Control A). Each group was placed in a sealed plastic box over filter paper for 7 days at room temperature. Whatman papers in the bottom of the plastic containers were dampened, respectively, with either Control A or Composition B. (There was no fungal inoculum used in the experiment-only natural flora naturally occurring on the beans.)

Composition B did not cause any acid-induced necrotic spots on the beans. Of the treated fruit, about 10 beans were infected, but it was almost strictly confined to the stem end of the bean. In contrast, severe rot was found wildly growing on the control beans. Almost every bean had developed some fungal infection, with infection points located anywhere on the bean. (Digital images are available, but not shown.)

In conclusion, Composition B is not toxic to the epidermis of the green bean fruits. It also appears that Composition B, when applied to fully developed and harvestable green beans, provides useful protection from decay. Composition B, as well as other compositions of this invention, can be applied at the time of harvest, when the beans are packed or upon arrival at a shipping destination. While spray application did not entirely inhibit infection, dipping or a longer contact with Composition B could be more effective in disease control—as a simple spray may not impact latent infections in the fruit stem ends.

It should be noted that the procedure used in this example (and other examples) represents extremely severe storage conditions, with 100% relative humidity at room temperature for an extended time of one week. Inasmuch as fruits and vegetables are typically stored at cool temperatures and low humidity, the results of this and other examples demonstrate the enhanced antimicrobial activity available through use of this invention.

Example 1v

Because this invention was shown to be effective in the preservation of broccoli and Brussels sprouts it was decided to use the formula on another cruciferous vegetable crop, cabbage. A select cabbage head was cut into halves. One half served as a control and the other half was treated. Following a procedure in accordance with the general procedure of example 1a, the treated half-head of cabbage was sprayed with about 0.5 ml of Composition B. Water (Control A) was sprayed on the other half head of cabbage. Whatman papers in the bottom of each container were slightly dampened with either Control A or Composition B to maintain moisture level in the container. The treated and control heads were placed in separate sealed plastic containers. After 32 days, at room temperature, the heads were evaluated for decay. (A fungal inoculum was not used-only natural flora naturally-occurring on the cabbage head.)

Composition B did not induce necrotic spots on the cabbage leaves at any time during this experiment. The leaves remained green throughout the test period and there was no decay. In contrast, the control leaves developed flecks caused by a fungus. Eventually, fruiting bodies appeared from the control head. Also, a major fungal infection developed in the stem area of the control cabbage head. (Digital images are available, but not shown.)

The results of this example nicely illustrate that Composition B, representative of various other compositions of this invention, can be used as a preservative of leafy vegetables.

Example 1w

With reference to a preceding example, this invention was shown to preserve large cucumbers and it was decided to test smaller pickle-sized fruit. Following a procedure in accordance with the general procedure of Example 1a, each cucumber in a group of 5 was sprayed with about 0.5 ml of Composition B. Each cucumber in a group of 6 was sprayed with water (Control A). Whatman papers were placed in the bottoms of plastic containers and dampened with about 0.5 ml of Control A or Composition B, respectively. Each plastic container was sealed with its respective lid and incubated for 6 days at 23° C. (There was no fungal inoculum used in the experiment—only natural flora naturally occurring on the cucumber.)

Composition B did not cause any acid-induced necrotic spots on the fruit up to 6 days and more after spraying. Likewise, none of the treated fruits showed signs of decay or incipient rot. There was no fungal growth on any of the fruits or the underlying filter papers of the treatment group. In contrast, after six days of incubation, the control cucumbers rapidly showed fungal growth and decay. (Digital images are available, but not shown.)

Example 1x

Following a procedure in accordance with the general procedure of Example 1a, baby bok choy leaves were removed from their clumps. One group of 4 leaves was carefully sprayed with a few milliliters of Composition B. Another group of 4 leaves were sprayed in the same manner with deionized water (Control A). Each group was separately placed in a sealed plastic box over Whatman filter paper for 7 days at room temperature. (There was no fungal inoculum used in the experiment—only natural flora naturally occurring on the leaves.) After 7 days the leaves were evaluated for decay and discoloration.

Composition B did not induce necrotic spots on the bok choy leaves. The treated leaves, with the exception of some slight yellowing on one leaf, remained normal in appearance, without discoloration at the leaf base. (Digital images are available, but not shown.) However, the control group of leaves showed discoloration, with bacterial and fungal-induced decay on each leaf, usually originating at the leaf base.

Example 1y

Periodically, and all too common, Romaine lettuce is contaminated with various enteric bacteria (e.g., *E. coli*), causing associated food-borne illness and prompting recall from the national market place. Accordingly, the present invention was accessed for antimicrobial effect on contaminants of this important crop.

Following a procedure in accordance with the general procedure of example 1a, a group of leaves were removed from a Romaine lettuce clump, and each was carefully treated by a spray with a few milliliters of Composition B. Another group of leaves was sprayed with deionized water (Control A). Each group was placed separately in a sealed plastic box over Whatman filter paper for 7 days at refrigerator temperature (i.e., 39-40° F.), to mimic typical consumer home storage conditions. (There was no fungal or bacterial inoculum used in the experiment—only the naturally occurring flora on the leaves was relied upon to cause damage and contamination of the leaves and provide a basis for comparison.)

Composition B did not cause any acid-induced necrotic spots, and there were no bacterial or fungal-induced lesions on the Romaine lettuce leaves. Likewise, the treated leaves remained normal in appearance and were crisp after 7 days. In contrast, the control group of leaves showed discoloration with bacterial and fungal-induced decay on each of the leaves, originating at various points on the leaves. The experiment was extended to two weeks and the treated leaves continued to be crisp, non-discolored and free of infection, whereas the control leaves were rotted, discolored and not edible. (Digital images are available, but not shown.)

To further demonstrate antimicrobial effect, a small tissue sample (about 3×3 mm) was taken from discolored areas of each control leaf and plated on potato dextrose agar (PDA). As there were no such areas on the treated leaves, tissue samples were taken at random. After one day of incubation, all of the control leaf samples were observed to host either bacterial or fungal microbes or, in some cases, both. Regarding the treated leaf samples, there were no bacterial or fungal organisms evident on the PDA plate. (Again, digital images are available, but not shown.)

In conclusion, Composition B is not toxic to the epidermis of the Romaine lettuce, and when applied to harvestable Romaine leaves provides protection from bacterial/fungal decay. From the results of this example, to inhibit and/or modulate microbial activity, it would appear that a composition of this invention could be applied at the time of harvest, when the Romaine lettuce is packed or upon arrival at a wholesale or retail destination.

Example 1z

The most prominent post-harvest asparagus disease concern is bacterial soft rot. Decay may be initiated at the spear tip or butt end. Spears that are re-cut above the white portion of the butt end are reported to be most susceptible to bacteria. Decay can easily develop over a relatively short time, even when the harvested spears are placed in a refrigerator (crisper) box. Again, the present invention was assessed for antimicrobial activity.

Following a procedure in accordance with the general procedure of example 1a, twelve asparagus spears were lightly but thoroughly sprayed with Composition B and placed in a plastic container having a moist paper towel base. Twelve control spears were similarly sprayed with water and, likewise, placed in a plastic box. (There was no inoculum used. Only the natural flora of the spears was relied upon as a microbial inoculum.) The plastic containers were held in the crisper box of a refrigerator for varying times and evaluated on the basis of spear head integrity and odor. Evaluations were made at 7 and 10 days—times longer than the time this vegetable is typically stored prior to consumption.

Composition B did not cause acid-induced necrotic spots on asparagus spears up to 10 days after treatment. In contrast, after 1 week of incubation, seven of the control spears showed a detectable start of decay. This, of course, was accompanied by a strong odor of decay that is so common in rotting potatoes and other crops. At 10 days, 8 of 12 control spears showed decay, while only 3 of the 12 treated spears showed signs of decay. (Digital images are available, but not shown.)

In summary, the modest spray of Composition B protected asparagus spears held in the crisper box (refrigerator) for up to a week. (At longer times, as reported above, decay started to manifest itself in the treated stems. The experiment was repeated with containers held at room temperature: all control spears were rotted at 5 days, but only half of the treated spears showed signs of decay). As demonstrated, Composition B can be used as a protectant to lengthen the shelf or storage life of asparagus. Compositions of this invention can be generally used in supermarkets as a protectant, by spray or other application, when the asparagus arrives or it can be treated in the field prior to packaging and shipment.

Example 1aa

Following a procedure in accordance with the general procedure of example 1a, each peach in a group of six was sprayed with about 0.5 ml Composition B, and absorbent papers in the bottom of a plastic container were dampened with 1.0 ml of water. The container was then sealed. As a control, each peach in another group of six was sprayed with 0.5 ml of water (Control A), then held and sealed in the same manner. The groups of test and control peaches were incubated at 23 °C for either 3 or 7 days. The experiment was done twice on two separate lots of Summer Flame peaches. It is to be noted that this test represents an extreme testing procedure because peaches are not normally held or stored under these conditions. (There was no fungal inoculum used in the experiment—only natural flora naturally occurring on the peaches being tested.)

It is observed that Composition B did not cause any acid-induced necrotic spots on the fruit over the duration of each trial. Also, Composition B served as a protectant, as contrasted with the control which resulted in total or partial decay of all fruits in both experiments. However, in one three-day trial some decay was noted on two peaches. (Digital images are available, but now shown.)

In summary, after three days of incubation the control fruits rapidly showed decay, whereas only two of the treated peaches in one trial showed some decay. After seven days of incubation, no treated fruit showed decay whereas all fruits in the control showed signs of decay.

Regarding application of Composition B, it can be used as a rinse or drench at or close to the time of harvest followed by a drying step. This sort of treatment would eliminate the surface contaminating microbes that may eventually cause fruit decay. Another possibility is an applied spray followed by drying prior to packaging such as in the clam shell plastic containers commonly used. Regardless, such applications, while effective, may be less than optimal against internally borne pathogens that may be present in the peach flesh as may be a condition underlying the two treated peaches which showed some decay.

Example 2

With references to Examples 2a f, below, and more generally to various preferred compositions and applications of this invention, the term "juice" in the context of the present invention means a liquid naturally contained in fruit or vegetable tissue. Juice is usually prepared by mechanically squeezing or macerating fresh fruits or vegetables without the application of heat or solvents. Many commercial juices are filtered to remove fibre or pulp, but high pulp fresh orange juice is a popular beverage. As discussed below, juice can be in concentrate form (i.e., a concentrate), sometimes frozen, requiring additional water to reconstitute the juice. Common methods for preservation and processing of fruit juices include canning, pasteurization, freezing, evaporation and spray drying. Popular juices include, but are not limited to, apple, orange, grapefruit, pineapple, tomato, passion fruit, mango, carrot, grape, cherry, cranberry and pomegranate.

The term "nectar" in the context of the present invention means a type of non-carbonated soft drink made with fruit or vegetable juice. In some countries, the beverage industry distinguishes nectars from drinks labelled as "juice". In the United States and the United Kingdom, the term "fruit juice" is restricted to beverages that are 100% pure juice, whereas "nectar" may contain ingredients in addition to fruit/vegetable juice. Examples of such ingredients are water (or other additional liquid), vitamins, sugar (or any kind of artificial or natural sweetener), flavors (artificial or natural), coloring agents (artificial or natural), preservatives, antimicrobial agents, thickeners, stabilizers, fibres, etc. These ingredients can be added in amounts which are common in the field of beverage making. It is preferred that all these ingredients are food grade or are allowable in food or beverage products. In addition to such ingredients, carbonated beverages can include a fruit/vegetable juice and/or nectar.

The (fruit/vegetable) juice or (fruit/vegetable) nectar formulations according to the present invention can be in a "ready-to-use" form. This means that the beverage can be consummated without any further processing (such as, for example, diluting). But it is also possible to provide juice or nectar compositions in a form which must be further processed before consumption. A very common form is a concentrate, which can be diluted either by the consumer just before consumption or by a producer, processor, distributor or retailer of an end product before packaging.

Preferred embodiments of the present invention include compositions comprising fruit or vegetable juices/concentrates and fruit or vegetable nectars. Very preferred embodiments of the present invention comprise fruit juice or fruit nectars made from oranges or grapes.

Example 2a

With reference to example 1a, Composition B was also used to extend the shelf life of fruit drinks. The tests of this example were conducted with commercially available orange juice. Again, no fungal or bacterial inocula were used in this experiment, only the natural flora of the juice was relied upon. Composition B was modified and reformulated with the following ratio of ingredients: 0.2 propanoic acid, 0.5 potassium isobutyrate, 0.2 isobutyl isobutyrate and 0.2 octyl acetate (v/w/v/v); the pH is 5.1, and reformulated B was tested over a range of reduced concentrations. Octyl acetate was chosen as a substitute for benzaldehyde because it constitutes the major flavor ingredient of orange juice. The juice samples were incubated at room temperature and assayed for microbial growth at 2, 3 and 4 weeks of incubation.

1. 100 ml of juice made up to 1% with Composition B
2. 100 ml of juice made up to 0.5% with Composition B
3. 100 ml of juice made up to 0.25% with Composition B
4. 100 ml of juice made up to 0.125% with Composition B
5. 100 ml of juice made up to 0.065% with Composition B
6. 100 ml of juice kept in the refrigerator at 40° C. Control
7. 100 ml of juice kept at room temperature Control At the end of each week, the solutions were examined for cloudiness and the presence of fungal colonies; i.e., fluffy inclusions in the juice. Four loops of each juice sample were streaked on half plates of PDA, then incubated at room temperature for 24 hours.

At the end of two weeks, testing all of the control and treatment cases, there were no detectable colonies of either bacteria or fungi on the streaked PDA plates. However, at three weeks the situation changed dramatically. In both the room temperature control and the 0.065% Composition B treatment the bacterial populations had increased to unacceptable levels. However, with treatments at 0.125% and 0.25% of Composition B levels there were no detectable bacterial colonies on the streaked plates. (Digital images available, but now shown.)

After 4 weeks incubation at room temperature the following was observed. The room temperature control and the 0.065% Composition B treatment were contaminated with bacteria. The control at refrigerator temperature was free of culturable bacteria. Likewise, samples tested with 0.25%, 0.5% and 1% of Composition B were free of bacteria. A small number of colonies appeared, on the PDA plate, at the 0.125% B concentration, but at an acceptable level.

As demonstrated, substitution of benzaldehyde with the octyl acetate did not significantly reduce the effectiveness of Composition B to control microbial growth in the orange juice held at room temperature for 4 weeks. Adjusting the level of octyl acetate can modify flavoring without compromising antimicrobial effect.

It is to be noted that the average stomach has a volume of about 1 quart. Drinking 1 cup of orange juice with a 0.125% concentration of Composition B would be diluted 3-4 fold to provide an effective stomach concentration in the range of 0.03% of Composition B. At this level, based on the preceding data, it would seem that B would have little or no effect on the human gut microflora. (It should also be noted that small molecular weight organic acids are commonly found in the human gut, and the addition of such a minor amount of Composition B will probably have no extraneous personal effect.)

Example 2b

With reference to the preceding example and the useful compositions demonstrated, at an effective 0.125% concentration of Composition B there are 25 microliters of octyl acetate per 100 ml of orange juice. It was found that such an amount of octyl acetate can unduly influence the orange juice taste. Taste-testing treated orange juice determined that about 5 microliters of octyl accetate was acceptable. The question is then whether Composition B, at this level, can retain antimicrobial activity and effectively inhibit microbial contamination of the orange juice.

A room temperature test was set up with a modified Composition B at the 0.125% level containing 0.062 g of potassium isobutyrate, 0.025 ml of isobutyl isobutyrate, 0.025 ml of propanoic acid and 0.005 ml of octyl acetate per 100 ml of orange juice. (Note that this formula provides a level of octyl acetate 20 microliters less than the amount of benzylaldehyde otherwise used in B.)

The control was untreated orange juice at room temperature. Sampling was done every few days by plating 4 loops of the juice sample on plates of PDA, followed by incubation for 24 hours.

When examined for microbial contamination, there were no microbial colonies visible after 1, 2 and 3 weeks of incubation, on plates streaked either the treated or control orange juice samples. After 23 days severe fungal contamination of the control was apparent, on a streaked PDA plate. (Digital images are available, but not shown.) The control juice began to smell of fungal growth, but the treated juice remained fresh and it retained a nice orange flavor.

As demonstrated, a reduced amount of octyl acetate in Composition B is adequate to maintain antimicrobial properties and provide satisfactory taste. Testing was also done at 4 weeks and a streaked PDA plate of the treated orange juice was free of microbial contamination. In contrast, the control plate showed massive contamination of the untreated orange juice.

The study of this example was continued with sample incubation for another week, bringing the total to 5 weeks at room temperature. At the end of this time, one loop full of each of the control and treated samples was spread over the surface of 50% of a PDA plate and incubated for 1 day. The results showed that the control juice was totally contaminated with fungal growth, but only one or two colonies appeared on the treated juice plate. The treated juice had good taste and was drinkable. The control was fetid. (Digital images are available, but now shown.)

The study was continued with incubation for another week, bringing the total to 6 weeks at room temperature. At the end of this time, one loop full of each of the control and treated samples was spread over the surface of 50% of a PDA plate and incubated for 1 day. The results showed that the control juice was totally contaminated with fungal growth, but only one colony appeared on the treated juice plate. The treated juice still had a nice taste and was drinkable. The few fungal spores in the treated juice were not growing and did not produce a mycelium. (Again, digital images are available.)

The study was continued with incubation for another week, bringing the total to 7 weeks at room temperature. At the end of this time, one loop full of each of the control and treated examples was spread over the surface of 50% of a PDA plate and incubated for 1 day. The result showed that the control juice was totally contaminated with fungal growth, but no colonies appeared on the treated juice plate. The treated juice still had a nice taste and was drinkable. There were no visible microbial colonies in the treated juice.

Digital images of the juice samples (not shown, but available) were recorded at 7 weeks. The room temperature control showed a large amount of contamination from fungal mycelial growth, with a prominent fungal mat on the juice surface. The treated orange juice solution had little to no microbial contamination, and regular orange juice was held in the refrigerator for the duration of the experiment. Both the treated and the refrigerated control orange juices upon shaking were perfectly tasty, and settling of pulp materials in the treated juice mimicked that of the refrigerated control.

As demonstrated, a modified Composition B using an appropriate amount of octyl acetate, as a substitute for benzaldehyde, was effective in preventing microbial growth in orange juice. The treated juice was found to be tasty and free of microbial contaminants at least up to 7 weeks at room temperature. The control juice was contaminated and unconsumable after 3 4 weeks at room temperature.

Example 2c

Following a procedure in accordance with the procedure of example 2b, grape juice was treated with Composition B modified to provide methyl anthranilate (MA) (a grape flavoring agent) as a substitute for benzaldehyde.

Preliminary taste testing determined that about 5 microliters of methyl anthranilate provided an acceptable taste level. Composition B was used at the 0.125% level and modified to contain 0.062 g of potassium isobutryate, 0.025 ml of isobutyl isobutyrate, 0.025 ml of propanoic acid and 0.005 ml of methyl anthranilate per 100 ml of grape juice. Note that this level of MA is 20 microliters less than the amount of benzylaldehyde used in Composition B, a level found to be very successful in the orange juice study of the preceding example.

Both the treated and control grape juice were kept at room temperature. (No microbes were used as inocula, only normal contaminating microbes were counted on as being present.) Sampling was done every week by plating 2 loops of the treated and control juice, respectively, on a half plate of PDA, followed by incubation for 24 hours.

After one week, microbial colonies were visible after plating/incubation of the control grape juice. In contrast, no colonies appeared after plating/incubation of the treated grape juice. The control juice began to smell of fungal growth, but the treated juice retained a fresh grape scent at 1 week. At two weeks, fungal contamination again appeared on the plated control juice, but not the treated juice. The actual grape juices in this experiment were photographed after two weeks of incubation. Fungal hyphae are visible in the control, but not the treated juice.

At three weeks, the juices were re-struck on PDA, and again the results were identical to what occurred at week two. There was fungal contamination of the control but not the treated juice. The same results were obtained at 4 weeks of incubation of the juice samples at room temperature, with the control contaminated and the treated juice free of microbial contamination. (Digital images are available, but not shown.)

Example 2d

Following a procedure in accordance with the procedure of example 2b, peach juice was treated with Composition B modified to provide gamma-decalactone (a peach flavoring agent) as a substitute for benzaldehyde.

Preliminary taste testing determined that about 5 microliters of gamma-decalactone provided acceptable taste. Composition B was used at the 0.125% level and modified to contain 0.062 g of potassium isobutyrate, 0.025 ml of isobutyl isobutyrate, 0.025 ml of propanoic acid and 0.005 ml of gamma-decalactone per 100 ml of a commercially available peach juice. Note that this level of the gamma-decalactone is 20 microliters less than the amount of benzylaldehyde used in Composition B, a level found to be very successful in the orange and grape juice, studies of the preceding examples.

Both the treated and control peach juice samples were held at room temperature. (No microbes were used as inocula-only normal contaminating microbes were present as the spoiling agents.) Sampling was done every week by plating 2 loops of each juice sample on a half plate of PDA, followed by incubation for 24 hours.

After one week, no microbial colonies were visible after plating/incubation of the control and the treated peach samples. However, after 2 weeks of incubation at room temperature the plated control revealed fungal contamination. There were no fungal colonies in the treated juice after plating. (Fungal colonies were also visible in the control juice, itself, while none were evident in the treated juice.) After three weeks there was massive fungal growth in the plated control, but not the treated juice. At six weeks the fungus continued to grow in the control juice, but the treated juice remained free of contamination. (Digital images are available, but not shown.)

As demonstrated, in the context of a fruit juice, the benzaldehyde component of Composition B—and, more generally, other compositions of this invention—can be substituted, whole or in part, with a flavoring agent compatible with the juice treated against microbial contamination.

Example 2e

With the results of example 2c, grape juice, it was thought to use a modified Composition B, containing methyl anthranilate instead of benzaldehyde, on red seedless grapes. (Again, there was no fungal inoculum used in the experiment-only natural flora naturally occurring on the grapes.)

A variation of the inventive composition used in the preceding example, 0.2 propanoic acid, 0.5 potassium isobutryate, 0.2 isobutyl isobutyrate and 0.2 methyl anthranilate (v/w/v/v) was made up to 1% solution in water. Red seedless grapes were sprayed with this modified Composition B, then placed in a plastic container on Whatman paper. The control berries were sprayed with water (Control A) and, likewise, placed over Whatman paper. Each plastic container, for the control and treated grapes, was sealed and incubated for 1 week at 23° C. The containers were then incubated for 2 additional weeks at 42° F. to mimic consumer refrigerator storage conditions.

Again, modified Composition B did not cause acid-induced necrotic spots on the fruit up to one week after treatment. Likewise, after 1 week, there was no fungal decay noted on any individual fruit; and there was no decay after 2 additional weeks at 42° F. In contrast, after 1 week of incubation, the control rapidly showed decay, with fungal growth apparent on nearly every grape; and the fungus grew and spread during 2 additional weeks at refrigeration temperature. As with example 1a and Compositions B and C, a modified, reformulated Composition B was shown to be effective as applied to grapes. (Again, digital images are available, but not shown.)

Example 2f

Given the results of the two preceding examples, with grapes and grape juice, just as modifications of Composition B were used with antimicrobial effect in orange and peach juice, corresponding compositions of this invention and variations thereof are used with comparable effect on orange and peach fruits.

Example 3a

Over the years, raw plant sprouts from commercial growers have been linked to several outbreaks of foodborne illness. Notable instances include:

October 1999. An outbreak of *Salmonella* that sickened at least 19 people in six Wisconsin counties was linked to contaminated alfalfa sprouts.

May 1999. Approximately 30 people in California were infected with *Salmonella* bacteria after consuming clover sprouts.

March to May 1999. Approximately 70 cases of *salmonellosis* in Colorado were associated with consumption of clover sprouts.

July 1998. Eight people in California and Nevada were infected with dangerous *E. coli* O157:H7 bacteria after consuming alfalfa/clover sprouts.

May 1998. Eighteen cases of *salmonellosis* were associated with the consumption of alfalfa sprouts in California.

Late 1997 to July 1998. Sixty cases of *salmonellosis* in California were associated with the consumption of an alfalfa/clover sprout mixture.

Without effective control, the plant sprout industry has declined and almost disappeared.

Regarding the reported outbreaks, the likely source of the pathogen was contaminated seed. Seeds may become contaminated by bacteria in animal manure in the field or during post harvest storage. Using animal manure to fertilize fields of alfalfa and other plants intended for non human consumption may be hazardous if seeds from such plants are then used for sprouting. During germination, abundant nutrients, high levels of moisture, and heat generated during the sprouting process help to ensure survival and growth of bacteria external to the plant tissues.

Mishandling of sprouts during production, packing, or distribution has not been implicated as the source of sprout contamination. However, bacteria already present in the sprouting seed can continue to thrive if proper food handling techniques are not practiced during harvest, processing, and preparation. In addition for a need to control pathogenic enteric bacteria, there is a need to have safe effective agents for the control of seed-associated fungal and bacterial pathogens that have the potential to cause seedling blights, damping off and disease expression on the developing plants. Toward this end, Composition B, a representative composition of this invention, was tested for potential to control fungal and enteric bacterial pathogens associated with seeds/sprouts. Because of its size and ease in handling, the mung bean (*Vigna radiata*) was chosen as the seed/sprout to explore these possibilities.

The mung bean seeds were obtained from a local seed dealer. In order to determine if the seeds were carrying enteric microbes, ten seeds were placed in 10 ml of sterile water for 15 minutes. Each bean was then carefully placed on a sterile Whatman filter paper until dryness was achieved. Subsequently, each seed was placed on a Petri plate containing PDA. The incubation time was 2 days, at which time all seeds appeared free of any major bacterial contamination—an indication that this batch of seeds could be used in the enteric bacterial inoculation test described below. However, interestingly, after 5 days of incubation at least three seeds began to sport fungal growth and one seed showed bacterial growth. Thus, the seeds were not entirely free of microbial contaminants. The seed with bacterial contamination tested negative when placed on the MacConkey medium (discussed below), which is selective for enteric bacteria such as *E. coli*. Thus, this seed batch was deemed essentially free of enteric bacteria.

The *E. coli* used in this experiment was isolated from the bodily wastes of co inventor Strobel, and was confirmed as *E. coli* by 16 S rDNA sequencing, to ensure that a wild type bacterium was used in the experiment, as a wild type microbe would likely be the most commonly encountered plant contaminant. (A lab type bacterium that may have undergone a loss of certain critical features upon continuous colony transfer may yield an organism that may not behave in a manner expected of *E. coli*.) Test results show that the 16 S sequence of the strain isolated represents a 99% match of its 16 S rDNA to that of authentic *E. coli* in the NIH GenBank. (Major Sequencing work was done at the School of Engineering—Biofilm Engineering Dept. at Montana State University by Heidi Smith. Other work was done by the ACGT Inc in Illinois by Dr. Hargeet Brar. The 16 S sequence is available, but not shown.)

MacConkey selective agar is a modification of Neutral Red Bile Salt Agar developed by MacConkey as a selective medium for enteric microbes. (By way of background, it was one of the earliest culture media for the cultivation, identification and isolation of enteric organisms. It has also been used in the isolation of pathogens from foods and coliforms in water samples.) The MacConkey Agar formulation presently in use is a modification of the original. In addition to containing sodium chloride, the modified formula has a lowered agar content and an adjusted concentration of bile salts and neutral red. Differentiation of enteric microorganisms is achieved by the combination of the neutral red indicator and lactose. Lactose-fermenting organisms form pink colonies surrounded by a zone of bile salt precipitation. The color change is due to the production of acid which changes the neutral red pH indicator from colorless to red. Acid production is also responsible for the formation of bile salt precipitation. Non-lactose-fermenters (*Salmonella* spp. and *Shigella* spp.) develop into transparent, colorless colonies with no precipitated zone. Peptones are incorporated into MacConkey Agar to provide amino acids and nitrogenous compounds. Sodium chloride is present to maintain osmotic equilibrium. Lactose is added as a possible carbon source for energy, and the acids produced from this activity precipitate out the bile salts. Bile salts and crystal violet are added to inhibit the growth of most gram-positive organisms.

About 300 mung bean seeds from the original batch were placed in 15 ml of distilled water containing about 2,800,000 cells of *E. coli*. The *E. coli* strain used is as described above. The seeds were then incubated for 15 min. in the bacterial suspension, placed on a towel blotter until free of moisture, then placed in a sterile positive air flow hood until dry. Half of the seeds were placed in a control water treatment consisting of 10 ml of sterile distilled water (Control A) for 15 min. The other half of the seeds were placed in 10 ml of Composition B (see Example 1) for 15 min. Each group of seeds were, respectively, placed on a damp Whatman filter paper in a sealed plastic container, then incubated for 24 hrs. at room temperature. Ten seeds were then randomly selected from the treatment group, as were ten from the control group, and they were placed aseptically onto PDA-petri plates. After 24 hrs. the seeds were examined for bacterial contamination: 8 of 10 in the control group were sporting bacterial colonies, but none in the treated group supported bacterial colonies. The observation was also made after 48 hrs. and photographed with the same result. (Each day a gentle spray of distilled water was administered to each seed group as the experiment continued.)

After 3 days of incubation on PDA, one seed in the treated group sported a *Pantoea*-like microbe and it was judged as a seed contaminant. This organism was negative on the MacConkey medium. Also, interestingly, after 3 days or more, 50% of the control group of germinated seeds were sporting fungal contamination, but none in the treated group showed the presence of any pathogenic fungi. This suggests that seed fungal pathogens were also controlled with this treatment-because none appeared in the Petri plates containing seeds treated with Composition B. An examination of all of the germinated seeds, after 3 4 days, in both groups revealed that 45% of the control group possessed rootlets that were discolored. These were plated on PDA and some of the common root infecting fungi were found associated with these discolored roots, a result very close agreement with the percent of the seeds on the PDA plate that were sporting fungal pathogens. In the treated seed group, only 1 2% of the roots showed discoloration. (Digital images are available, but not shown.) As a side note, the treated mung beans germinated as well as the control group indicating that the treatment with Composition B did not inhibit seed germination.

In the case of the control group the isolated colonies (from each of 7 of 8 seeds) met a perfect outward match for *E. coli* that was used as the inoculum after 3 days on PDA; that is, they were off-white or beige in color with a shiny texture. The colonies looked as if there was a mucus or a cloudy film over the whole surface of the colony. The colonies were slightly raised and had an entire, fixed margin and a steady growth pattern, creating concentric growth rings in the colony. Each of the isolates from the 7 seeds were examined by Gram staining and each revealed a Gram negative rod shaped bacterial population fitting the size and shape of standard *E. coli* as described in the literature as well as with the *E. coli* strain used to inoculate the seeds. Furthermore, when the bacterial colonies isolated from the 7 control seeds were streaked onto the MacConkey medium each grew with the classical red colony formation. The results obtained were expected for the presence of *E. coli*. (It is to be noted that the one bacterium isolated from the treated group of seeds was negative in the MacConkey test and only the untreated or control seeds bearing the enteric bacteria inoculation load gave strict positive reactions in the MacConkey test. (Digital images are available, but now shown.)

Although the data are conclusive for the observation that Composition B was effective in the treatment of mung bean seeds bearing *E. coli* infestation, additional work was done to unequivocally show that the bacterial species isolated from the control seeds in this experiment was in fact an *E. coli* isolate originally used as inoculum. Two of the seven isolated bacterial cultures were selected for 16 S rDNA sequencing at the MSU sequencing lab at the Biofilm center in the Engineering College. The results showed 95 and 96% identity to the 16 S rDNA to that of the *E. coli* starting culture. The results did suggest that the cultures isolated directly from the seeds may not have been pure, but *E. coli* was present. This is to be expected because the seeds with which the study was started were mostly but not entirely free of bacterial contamination, and the results are what would be expected with seeds not pretreated in any manner.

Example 3b

Because Composition B was effective in protecting mung bean seeds from fungal and enteric bacterial contamination, it was therefore desirable to formulate B with a suitable solid carrier that could be applied to the mung bean seed. Toward this end, bentonite clay particles were ground in a mortar with a pestle until the particles were a powder. The components of Composition B, in the ratio provided in Example 1, were added to 10 grams of bentonite powder in an amount sufficient to provide two formulations of the components of Composition B: at a 10% level and at a 1% level. For each 20 seeds treated 1 gram of the formulated powder as control was used. Each group of seeds was placed on dampened Whatman filter paper and incubated in a sealed plastic box for three days at room temperature. At the end of two days another water spray was added. At the end of three days, 12 of 23 control seeds exhibited roots with browning and decay. There was no decay in the treated seed groups, but the group treated at the 10% level showed a retardation in seed development. Therefore, it appears the amount of composition of this invention should be controlled at a level where it is effective against fungi, but not affecting plant development.

As shown by the preceding examples, Composition B was effective as a mung bean treatment to control fungal infections of the germinating seeds, especially the newly developing rootlets. Further, Composition B effectively eliminated the detectable presence of *E. coli* on mung bean seeds, demonstrating a safe, effective means of controlling enteric pathogenic bacteria that can be extended to the treatment of alfalfa, bean, and other sprouts, together with other vegetables and fruits, and seedlings, to reduce enteric bacterial contamination.

Components of Composition B can, for instance, be formulated into a solid carrier (e.g., with bentonite at the 1% level) which can be dampened with water with seed then added to it. The sticky bentonite adheres to the seed coat and releases such an inventive composition to the seed coat to protect it from infection. Other carrier or sticking agents could also be used. Almost complete control of fungal infection of the seeds was realized.

Example 4

Many seeds carry the spores of plant pathogens, and germination begins the infection process. For the sprouting industry, there remains a search for a safe effective fungal control agent that will control the pathogens without harming the plant.

Toward this end, the present invention was evaluated for use in disinfecting radish seeds of fungi. Following a procedure in accordance with the procedures of Examples 1a and 3a, a set of about 100 seeds were placed in Composition B for 15 minutes. A second group of seeds was placed in water (Control A) for 15 minutes. (Soaking for a period of time was found to be more effective than spray application.) Each group of seeds was removed and placed, respectively, on a damp Whatman filter paper and incubated for 5 days at room temperature in a sealed plastic container. (A fungal inoculum was not used-only natural flora naturally occurring on the radish seeds.)

The seeds were then observed for any effects after 5 days. In the control group, 91% of the radish seedlings had a discolored, fungal infested rootlet. In contrast, in the treated group only 8% of the roots were discolored with the remainder having healthy whitish roots. Such results demonstrate the utility of this invention to modulate, inhibit or otherwise control microbial infection of plant seeds and sprouts.

Example 5

Smut disease, caused by *Ustilago avenae*, is pervasive in all areas where oats are grown. The two smut diseases of oats-covered smut and loose smut—are very similar in appearance. When a smutted oat panicle emerges from its enclosing sheath, an olive-brown to brownish black powdery mass (sorus) of smut spores has completely replaced the oat grains, and sometimes even the awns and glumes. This smut mass is composed of many millions of spores (teliospores), contained within a delicate, whitish gray membrane. Smutted panicles do not spread as widely as normal ones. Usually all of the spikelets and heads on an infected plant are smutted. Occasionally, the panicle on the main tiller may escape or perhaps some upper spikelets in a head may appear healthy. Smutted plants are generally shorter than healthy plants and are often passed over by harvest machinery. In loose smut, the thin membrane usually breaks and disintegrates soon after the oat panicles emerge. The naked mass of smut spores is quickly scattered by wind and rain, leaving a denuded panicle.

Typically, fungicides are used to treat seed and are effective in disease control. However, with the advent of organic agriculture other alternatives will be necessary for disease control. To this end, it was decided to test a representative composition of this invention on *Ustilago avenae* and also gauge its effect on oat seed germination. (Digital images of results are available, but not shown.)

Healthy oat seeds and loose smut spores on diseased oats were obtained from a local producer. Composition B is as described in example 1 and was evaluated initially against an inventive composition of Table 10 of the aforementioned '462 Patent, designated as B-23. All tests were conducted at room temperature.

In order to determine if a basic B-23 formula had any effect on Ustialgo *avenae*, various amounts of it were placed into a plastic center wells of PDA plates sprayed with spores of the fungus. After several days the plates were observed: the highest amount of B-23 at 50 µl cleared the plate of all growth; at 20 µl there was severe inhibition of the fungus. However, even though it controlled the fungus, B-23 was not used, as it was thought that the acidity (low pH) would inhibit and kill the oat plants. Accordingly, studies of this example were conducted with Composition B.

Example 5a

Initially, 10 ml of Composition B was placed in a small plastic container and 20 mg of spores on plant material were mixed thoroughly therewith. After 15, 30, 60 and 120 minutes, bits of plant material were aseptically removed from the container with forceps and rinsed with sterile distilled water. The material was then streaked onto a plate of PDA. Correspondingly, a water control was matched with each treatment time. The plates were incubated for two days, with the results recorded.

Treatment exposure times of 15, and 30 min were less than optimal in controlling the germination and growth of *Ustilago avenae*. However, an exposure time of at least 1 hr fully controlled the growth of the fungus. Microscopic examination of the spores treated 1 hr revealed that none had germinated, even after having been on the plate for 2 days. By contrast, all water controls, for the designated times of 15 min., 30 min., and, 1 hr, showed growth and development of *U. avenae*.

Example 5b

To access effect on germination, oat seeds were exposed to Composition B for 1 hr, rinsed with water then plated on water agar. After two days, the germination rate was identical to that of a water control, at about 95%. Likewise, the rate of growth was identical to that of the water control; i.e. rootlet development length, root hair growth etc. These and the results of the preceding example show that, under the condition utilized, B controlled smut disease and did not cause an impact on seed development. Exposure to B for a time up to 2 hr caused some restriction in seed germination and development.

Example 5c

Oat seeds inoculated with spores of loose smut were treated for 24 hr in Composition B then plated on water agar. Germination was delayed for about one or two days. However, after 1-2 days the 24 hr treated seeds germinated and were free of smut. The germination rate was not reduced: at the 95% level, it was the same as the control. However, the seedling development in the treated seeds was just slightly behind that of the control group. As compared to a water control group, the treated seedlings were relatively free of fungal contamination. There was no smut spore development.

Example 5d

Because it is not practicable to soak seeds in a disease control agent before planting, it was decided to test use of Composition B with bentonite at concentrations of 0, 1, 5 and 10%. Bentonitie is used strictly as an inert carrier of Composition B. To bentonite at 1 gram was added each of the ingredients to bring the concentration of Composition B to these percentage levels. For instance, at the 10% level, 20 microliters each of propanoic acid, benzaldehyde, and isobutyl isobutyrate along with 50 mg of potassium isobutyrate was added to 1 gram of well-ground, powdery bentonite. The ingredients were thoroughly mixed in a mortar with pestle.

In a plastic bag, about 40 seeds were added to a bentonite/Composition B (10%) mixture. The contents were shaken. About 4 mg of freshly-harvested smut spores were then added. Bentonite adheres nicely to the seeds, as noted by microscopic observation. (As a control, bentonite powder without Composition B was added to smut-infected seeds.) The seeds were held dry at room temperature for 5 days, after which 20-25 seeds from each group were carefully placed on to a Petri plate with PDA. Excess bentonite mixture that contained the smut spores used as inoculum was also placed on a portion of the plate. After incubation for 3 days, fungi grew in great proliferation on the control plate seeds, as well as on the control bentonite carrier. In contrast, the bentonite/Composition B mixture and infected seeds treated with the bentonite/Composition B mixture were relatively free of fungal growth.

Example 5e

An in planta experiment was conducted using oat seeds (20) and 1 g of powdered bentonite formulated with 10% Composition B (v/v/v w). The control was seeds with bentonite, alone. Each seed mixture was introduced to 4 mg of loose smut spores then incubated for 42 days* prior to planting. The seeds were placed into pots and were grown under greenhouse conditions with proper watering and fertilization for 5 weeks. The control plants were noticeably stunted after 5 weeks of growth, as compared to the treated plants.

The plants were held in their growth period for an additional 5-6 weeks under greenhouse conditions. At the end of 10-11 weeks from the time of planting they were evaluated for the development of any disease heads. This was done by excising each plant stem that was developing as a seed head. All stems having a seed head were evaluated. It is to be noted that the total number of seed heads in each group (control and treated) exceeds the total number of seeds planted because many of the plants tillered, and there was more than one seed head per plant. A total count of the diseased and healthy heads were made in the control and treated groups. As expected, there was more tillering—and more seed heads—in the treated group.

In the control group there were 26 heads counted, and 13 of these were diseased, for a 50% disease development rate. In contrast, the treated group had 33 heads, but only 3 heads were diseased, for a 9% disease development rate (i.e., a 91% control rate). The experiment was repeated and the typical stunting of the control plants was again observed. (*Disease control was less effective with less treatment time.)

As shown, Composition B, a representative composition of this invention, can be successfully used to treat seeds for the control of loose smut of oats, and other seed-borne diseases (e.g., reference experiments on mung beans). Typically, for a seed treatment, at least a 99% control rate for a seed borne disease is expected. Here, use of Composition B resulted in a 91% control rate of loose smut on oats. This rate can be improved by increasing the concentration of B on a carrier to, for instance, a level of 12 or 15%, to increase effectiveness. Again, an advantage of B is that all of its component ingredients are on the FDA-GRAS list and it, together with various other compositions of this invention, can be used for organic agricultural applications.

In accordance with other aspects of this invention, appropriate composition concentrations and time exposures can be developed for each plant type, with an awareness of possible adverse effects on germination.

While the results of this example show that Composition B does have a controlling effect on loose smut of oats, other smuts including covered smuts of oats, barley etc. can be treated. Other seed borne diseases would also lend themselves for treatment with compositions of this invention, including diseases caused by damping off fungi.

Such compositions can also be used to treat soil-seed beds directly to reduce infection by seed borne diseases. The treating agent can be or incorporate a composition such as but not limited to Composition B mixed with any number of carriers including bentonite or other inert carriers. Such a mixture can be co-planted with individual seeds or sprayed and mixed over the entire seed bed area.

Example 6

While effective in reducing, eliminating or otherwise modulating disease incidence, various compositions of this invention-depending on relative component levels—can induce or cause some small necrotic spotting on more sensitive fruits (e.g., grapes). Without limitation to any one theory or mode of operation, it was thought that the propanoic acid level and/or composition pH may cause or induce the necrosis observed.

With reference to example 1a, a range of useful compositions and relative component amounts, of such compositions, were further assessed. A $C_4$-$C_6$ acid salt (e.g., potassium isobutyrate) was substituted for propanoic acid, maintaining a 7:2 (v/w) ratio of propanoic/isobutyrate to any other composition component (e.g., isobutyl isobutyrate or benzaldehyde). Accordingly, six compositions were formulated, as follows:

1. 6 parts propanoic acid to 1 part potassium isobutyrate; pH 3.98
2. 5 parts propanoic acid to 2 parts potassium isobutyrate; pH 4.40
3. 4 parts propanoic acid to 3 parts potassium isobutyrate; pH 4.86
4. 3 parts propanoic acid to 4 parts potassium isobutyrate; pH 4.75
5. 2 parts propanoic acid to 5 parts potassium isobutyrate; pH 5.10 (Composition B in example 1a)
6. 1 parts propanoic acid to 6 parts potassium isobutyrate; pH 5.31 (Composition C in example 1a)

each with 2 parts isobutyl isobutyrate and 2 parts benzaldehyde (v/w/v/v) to assess induction of tissue necrosis. Diluted to 1% with water, each composition was tested on healthy Thompson seedless grapes. Each of six groups of about 10 individual fruits was sprayed with a different test composition, placed separately in an individual plastic container with filter paper liners then sealed. A group of control grapes was sprayed with water. (No fungal or bacterial inocula were used in the experiment-only the native flora of the grapes were relied upon as disease causing agents.) After 7 days of incubation at 23° C., all treated fruits in each group were examined for necrotic spotting or generalized necrosis.

Evaluation, as observed:

1. Each grape in treatment 1 exhibited distinct small, brown, sunken necrotic lesions. There was also some generalized brownish necrosis near the necrotic spots.
2. There were fewer lesions on the grapes in treatment 2, and there was generalized tissue necrosis on the bottom side of several grapes.
3. Only two questionable spots appeared on grapes in treatment 3.

4. No necrotic spotting was evident on these grapes.

5. No necrotic spotting was evident on these grapes.

6 No necrotic spotting was present on these grapes. (Digital images of all treated grapes are available, but not shown.)

All grapes in the control (untreated) container were seriously decayed. In contrast, fungal decay was not observed on any treated grape. However, under the conditions utilized, necrotic spotting can be modulated by compositions of the sort used in conjunction with treatments 3-6, preferably by those of the sort in treatments 4-5 and, optionally, 6—depending on the necrotic susceptibility of the fruit/vegetable treated. Without limitation, various compositions of this invention with a propanoic/isobutyrate ratio of about 4:3 to about 1:6 (e.g., a pH greater than about 4.4), preferably with a ratio of about 3:4 to about 2:5 (e.g., a pH of about 4.75 or greater) and, optionally, about 1:6, can effectively reduce or eliminate the incidence of necrosis.

The pH of any such composition is due primarily to the relative amounts of propanoic acid and a $C_4$-$C_6$ acid salt such as potassium isobutyrate and is largely independent of the presence and/or amount of $C_2$-$C_5$ acid ester(s), such as but not limited to isobutyl isobutyrate, and/or of $C_2$-$C_5$ aldehyde(s), such as but not limited to benzaldehyde. Accordingly, without limitation, compositions 3-6 having a pH greater than about 4.4 can be utilized with or without such an acid ester and/or aldehyde incorporated therein.

Example 7

To further assess effectiveness of various non-limiting compositions of this invention, the minimum inhibitory concentration (MIC) of Composition B was determined against major fungal plant pathogens. Likewise, the MICs of Composition D (see, example 1) and Composition E (0.35 propanoic acid, 0.35 potassium isobutryate, 0.2 isobutyl isobutryate and 0.2 benzaldehyde (v/w/v/v)) were determined. Each was made up to 1% in sterile water and diluted in twelve 1-milliliter well plates. Into each well was added 0.5 ml of potato dextrose broth along with water and either B, D or E to a final volume of 1 ml. Small 3×3 mm blocks of agar containing a specified pathogen were added, and MIC readings were made at 30 hr after the start of the experiment. The values in the Table 3 represent, respectively, the percent concentrations of B, D and E for 100% inhibition within 30 hr of incubation at room temperature.

TABLE 3

|   | Sclerotinia | Verticillum | Pythium | Aspergillus | Fusarium | Geotrichum |
|---|---|---|---|---|---|---|
| E | 0.12 | <0.06 | <0.06 | <0.06 | 0.12 | 0.5 |
| B | 0.25 | <0.06 | 0.06 | 0.12 | 0.12 | 0.5 |
| D | 0.25 | <0.06 | 0.06 | 0.12 | 0.12 | 0.5 |

From the results observed, antimicrobial effect is maintained with partial substitution of an isobutyrate salt for propanoic acid. Likewise, as compared to Composition D, reduction in the number of components in Compositions B and E did not diminish biological activity. (Compare, e.g., the results of example 52 of the aforementioned '462 Patent.)

Example 8

Together with the preceding examples, comparative testing of a representative composition of propanoic acid and a salt of isobutyric acid (e.g., potassium) demonstrated this invention as providing antimicrobial effect when incorporated into a food item. More specifically, 0.1 gram of potassium isobutyrate was added to 20 microliters of propanoic acid. (Similarly, several reference compositions were also prepared, as indicated in Table 4, below.) The test and reference compositions were hand-mixed into 10 grams of fresh refrigerated hummus (Costco) and placed in a sealed container. The treated and control containers were held at 25° C. then examined and sampled at 10 and 18 days. Sampling of each container was accomplished with a sterile transfer needle, with approximately 1 mg. streaked onto a potato dextrose agar (PDA) Petri plate, incubated for 30 hours, then examined. Results are summarized in Table 4, below.

TABLE 4

| Treatment | Appearance (10 days) | Taste (10 days) | Appearance (18 days) | Taste (18 days) |
|---|---|---|---|---|
| Control 10 g hummus | Odiferous product; fungal growth visible; considerable growth on PDA | Not taste tested | Advanced fungal growth over almost the entire surface of the food product | Totally repugnant smell; not taste tested |
| A | Product appeared normal, as per original hummus; no discernable microbial growth on PDA plate | Excellent taste, as per original hummus | The product appeared normal, as per original hummus; no microbial growth on product surface; no discernable microbial growth on PDA plate | Taste remains comparable to that of original refrigerated hummus product |
| B | Product appears about the same as original hummus; light microbial growth pattern on PDA plate | Acidic taste and tangy flavor | Fungal colonies developed on product surface | Unacceptable tangy acid-like taste |

TABLE 4-continued

| Treatment | Appearance (10 days) | Taste (10 days) | Appearance (18 days) | Taste (18 days) |
|---|---|---|---|---|
| C | Product appeared normal as per original hummus; considerable microbial growth on PDA plate | Acid-like taste | No apparent fungal or other bacterial growth on product surface | Stronger acid-like taste |
| D | Odiferous; great deal of microbial growth on PDA plate | Putrid taste | Some microbial growth on surface of product | Putrid taste |

A: 0.1 g K isobuyrate in 20 µl propanoic acid, in 10 g hummus
B: 20 µl propanoic acid, in 10 g hummus
C: 0.2 g Na₂HPO₄ in 100 µl propanoic acid, in 10 g hummus
D: 0.1 g K isobuyrate, in 10 g hummus As evidenced by the comparative test data, and the forgoing examples, the claimed compositions of this invention provided enhanced antimicrobial activity (i.e., greater inhibition of growth) as compared to components thereof which may be naturally occurring. Such enhanced results show there is a marked difference in functional characteristics of the claimed compositions, as compared to any such natural counterparts, and establish that such compositions are not product of nature exceptions.

Example 9

U.S. Pat. No. 8,728,462, owned by the assignee of the present application and incorporated herein by reference thereto, discloses a biomimetic antimicrobial composition based on the volatile organic compounds produced by Muscodor crispans. The main ester in *M. crispans* is isobutyl isobuyrate, a $C_4/C_4$ acid/alcohol. A new species of Muscodor has been discovered that also exhibits a wide spectrum of antifungal activity. The VOCs produced by the new fungus (referred to as "N-6") were determined using the standard SPME fiber technique and are listed below in Table 5. One compound of note produced N-6 is an ester of $C_4/C_5$ alcohol/acid, in particular isobutyl isopentanoic acid ester (or isobutyl isovalerate). The antifungal activity of the VOCs of N-6 as determined in a split plate bioassay against a variety of fungi is shown in Table 6, below.

TABLE 5

VOCs produced by newly discovered *Muscodor* sp.

| Retention Time | Estimated Concentration (ppbv) | Compound (NIST nommeclature) |
|---|---|---|
| 1.313 | 166.6 | Carbon dioxide |
| 1.346 | 39.1 | Cyclobutane, 1,2,3,4-tetramethyl- |
| 1.406 | 34.9 | 1,3-butadiene |
| 1.462 | 38.9 | Methane, chloro- |
| 1.499 | 26.5 | oxtri (isoprpoxo) vanadium |
| 1.961 | 9 | Methane, thiobis- |
| 3.593 | 159.1 | *Propanoic acid, 2-methyl- |
| 3.79 | 9.6 | *Ethanol |
| 4.349 | 13.5 | 2-Hexane, 5,5-dimethyl-, (Z)-. |
| 4.51 | 22.9 | (Z)-4,4-dimethyl-2-pentenal |
| 4.913 | 13.3 | *Acetic acid, 2-methylpropyl |
| 5.32 | 9.7 | *Isoxazole, 3,5-dimethyl- |
| 5.395 | 82 | *Benzene, methyl- |
| 5.977 | 9 | 1-propene, 2-methyl-, tetramer |

TABLE 5-continued

VOCs produced by newly discovered *Muscodor* sp.

| Retention Time | Estimated Concentration (ppbv) | Compound (NIST nommeclature) |
|---|---|---|
| 6.308 | 22.7 | *2-butanol |
| 6.63 | 37.8 | *1-butanol, 3-methyl-acetate |
| 6.745 | 171.5 | *Benzene, ethyl- |
| 6.986 | 30.9 | *Benzene, 1,4-dimethyl |
| 7.753 | 79.1 | Isobutyl Isopentanoic Acid Ester |
| 8.077 | 131.6 | 1-butanol, 3-methyl |
| 8.949 | 40.2 | 1,3,5,7-cyclooctatetraene |
| 9.004 | 40.2 | *Styrene |
| 9.528 | 25.9 | *Pyrrolidine |
| 9.528 | 9.6 | 4H-1,2,4-triazole, 4-ethyl |
| 10.963 | 11.2 | Benzene, 1,1'-(1-ethenyl-1,3-propanediyl)bis |
| 11.04 | 13 | 1-propene, 2-methyl-, trimer |
| 11.856 | 12.5 | 2(5H)-furanone, 5,5-dimethyl |
| 11.949 | 11.4 | cyclohexanone, 5-methyl-2-(1-methylethyl)- |
| 12.042 | 13.2 | (1-methyl-1,2,3,4-tetrahydro-8-quinolinato-O,N)Bora |
| 13.709 | 13.1 | *trans-4,11,11-trimethyl-8-methylenebicyclo[7.2.0]undeca-4-ene |
| 14.25 | 18.9 | Propanamide, N,2-dimethyl- |
| 15.068 | 19.3 | 6-Aza-1,2,3a-tetrahydropyrrolo[1,2a]quinoxlin-4-one |
| 15.068 | 37.2 | .beta.-selinene |
| 15.134 | 61.1 | .delta.-guanene |
| 15.187 | 11.1 | cyclobuta[1,2-b,4,3-b']bisthiopyran, Decahydro-, 1,1,8,8-tetraoxide |
| 15.692 | 9.1 | *naphthalene |
| 16.332 | 21.5 | *Acetic acid, 2-phenylethyl ester |
| 17.424 | 33 | *Benzene, ethanol |
| 19.891 | 11.9 | 6,10,11,11-tetramethyl-tricyclo[5.3.0.1(2,3)]undec-7-E |
| 20.807 | 9.6 | Globulol |
| 20.956 | 9.6 | Sandaracopimaradiene |
| 24.497 | 10 | *Benzoic acid |

TABLE 6

Split bioassay using N-6 tested against a variety of fungi

| Test Organism | Against N-6 | Control | % Inhibition | Dead/Alive |
|---|---|---|---|---|
| *Alternaria helianthi* | 0 ± 0 | 1.225 ± 0.1768 | 100 ± 0 | Dead |
| *Stagnospora* sp. | 0 ± 0 | 1.25 ± 0.2121 | 100 ± 0 | Alive |
| *Drechslera triticirepentis* | 0 ± 0 | 1.65 ± 0.2121 | 100 ± 0 | Dead |
| *Alternaria helianthi* (repeat) | 0 ± 0 | 1.45 ± 0.0707 | 100 ± 0 | Dead |
| *Cochiolobolus carbonum* | 0 ± 0 | 1.975 ± 0.1768 | 100 ± 0 | Dead |
| *Fusarium culmorum* | 0 ± 0 | 4.25 ± 0.3536 | 100 ± 0 | Dead |
| *Fusarium oxysporum* | 0 ± 0 | 1.5 ± 0.1414 | 100 ± 0 | Alive |
| *Fusarium avenaceum* | 0 ± 0 | 1.8 ± 0 | 100 ± 0 | Dead |
| *Bipolaris sorokiniana* | 0 ± 0 | 1.45 ± 0.0707 | 100 ± 0 | Dead |
| *Rhizoctonia solani* | 0 ± 0 | 2.7 ± 0.1414 | 100 ± 0 | Dead |
| *Candida albicans* | n/a | n/a | ~20% | Alive |
| *Bacillus subtilis* | n/a | n/a | 100% | |
| *Escherichia coli* | n/a | n/a | 0% | Alive |
| *Trichoderma viridae* | 6.5 ± 0.0707 | 6.5 ± 0.0707 | 0% | Alive |
| *Pythium ultimum* | 0 ± 0 | 6.3 ± 1.273 | 100 ± 0 | Dead |
| *Fusarium solani* | 0.4 ± 0 | 2.1 ± 0.4243 | 80.555 ± 3.924 | Alive |
| *Phytophthora palmivora* | 0 ± 0 | 0.7 ± 0.1414 | 100 ± 0 | Dead |
| *Phytophthora cinnamomi* | 0 ± 0 | 1.1 ± 0.1414 | 100 ± 0 | Dead |
| *Sclerotina sclerotiorum* | 0 ± 0 | 0.7 ± 0.1414 | 100 ± 0 | Dead |
| *Geotrichum candidum* | 0 ± 0 | 1.1 ± 0.1414 | 100 ± 0 | Dead |
| *Colletotrichum lagenarium* | 0 ± 0 | 1 ± 0.2828 | 100 ± 0 | Dead |
| *Mycosphaerella fijiensis* | 0 ± 0 | 0.35 ± 0.0707 | 100 ± 0 | Dead |
| *Cercospora* sp. | 0 ± 0 | 0.45 ± 0.0707 | 100 ± 0 | Alive |
| *Verticillium dahliae* | 0 ± 0 | 0.6 ± 0 | 100 ± 0 | Dead |
| *Aspergillus fumigatus* | 0 ± 0 | 0.9 ± 0.1414 | 100 ± 0 | Dead |
| *Ceratocystis ulmi* | 0 ± 0 | 0.7 ± 0.1414 | 100 ± 0 | Dead |
| *Botrytis cinerea* | 0 ± 0 | 0.95 ± 0.0707 | 100 ± 0 | Dead |

In view of the presence of isobutyl isobutyrate in the biomimetic composition of the '462 patent, the inventors surmised that the isobutyl isovalerate would provide good antimicrobial activity as a substitute for isobutyl isobutyurate in certain antimicrobial compositions. An antimicrobial composition ("Composition E") was prepared that includes propanoic acid, isobutyl isobutyrate, and benzaldehyde at a ratio of 7:2:2 v/v/v. Another antimicrobial composition ("Composition F") was prepared that includes propanoic acid, isobutyl isovalerate, and benzaldehyde at a ratio of 7:2:2 v/v/v. The antifungal activities of Compositions E and F as well as Composition D of Example 1a were tested against a variety of plant pathogenic fungi. The results are shown in Tables 7-9. The test organisms were selected from pathogenic fungi with a particular emphasis on parasitic *Fusarium* spp. The freshly grown organisms were placed on small squires on PDA plates. The test mixtures for Compositions E, F, and D were placed in a plastic cup located in the center of the plate at the rate of 10 µl per cup with nothing placed in a control plate. The plates were sealed with parafilm and incubated for 36 hr at room temperature. The 10 µl volume has been shown to be the best test volume for assessing the activity of fungal VOCs. The test organisms are all plant pathogens except *Trichoderma*. They represent all classes of fungi from Basidiomycetes, Ascomycetes, Phycomycetes and Fungi Imperfecti.

All of the fungi on the control plate (having no antifungal agent added) grew rapidly. At the end of the incubation time, three measurements were made of fungal growth on each of the small PDA squares. These data were averaged and the standard deviation calculated. The same was done with the control plate, and the percent inhibition of each fungus was calculated, i.e., growth with a treatment/growth of control× 100 then −100 to yield % inhibition. Alive/dead evaluations were made two days after exposure to the test formulae.

TABLE 7

Results of the VOC inhibition test with Composition F against a variety of plant pathogenic fungi. Results after 36 hr of exposure.

| Fungus tested | Measurement | % Inhibition | Alive or Dead |
|---|---|---|---|
| *Aspergillus flavus* | 0.75 ± .2 | 93 | alive |
| *Trichoderma viride* | 3.6 ± 1.7 | 78 | alive |
| *Rhizoctonia solani* | 0.0 | 99 | alive |
| *Microdochium nivale* | 0.0 | 100 | dead |
| *Fusarium pseudograminearum* | 0.0 | 99 | alive |
| *Cochliobolus sativus* | 0.0 | 100 | dead |
| *Pythium ultimum* | 0.0 | 100 | dead |

TABLE 8

Results of the VOC inhibition test with Composition E against a variety of plant pathogenic fungi after a 36 hr exposure.

| Fungus tested | Measurement | % Inhibition | Alive or Dead |
|---|---|---|---|
| *Aspergillus flavus* | 0.7 ± .2 | 83 | alive |
| *Trichoderma virde* | 5.3 ± 1.2 | 67 | alive |
| *Rhizoctonia solani* | 0.8 ± 0.2 | 92 | alive |
| *Microdochium nivale* | 0.5 ± 0 | 50 | alive |
| *Fusarium pseudograminearum* | 0.1 ± 0 | 98 | alive |
| *Cochliobolus sativus* | 0.1 ± 0 | 97 | alive |
| *Pythium ultimum* | 0.0 | 100 | dead |

TABLE 9

Results of the VOC inhibition test with Composition D against a variety of plant pathogenic fungi after a 36 hr exposure.

| Fungus tested | Measurement | % Inhibition | Alive or Dead |
|---|---|---|---|
| *Aspergillus flavus* | 1.5 ± 0.4 | 63 | alive |
| *Trichoderma virde* | 10.3 ± 4.5 | 36 | alive |

TABLE 9-continued

Results of the VOC inhibition test with Composition D against a variety of plant pathogenic fungi after a 36 hr exposure.

| Fungus tested | Measurement | % Inhibition | Alive or Dead |
|---|---|---|---|
| Rhizoctonia solani | 1.0 ± 0.4 | 90 | alive |
| Microdochium nivale | 0.1 ± 0 | 90 | alive |
| Fusarium pseudograminearum | 1.1 ± 0.6 | 70 | alive |
| Cochliobolus sativus | 0.6 ± 0.3 | 82 | alive |
| Pythium ultimum | 0.0 | 100 | dead |

As can be determined from Tables 7-9, Composition F provided the highest inhibition rates against the plant pathogens tested. Thus, Applicant sought to determine the effectiveness of an antimicrobial composition containing isobutyl isovalerate in place of isobutyl isobutyrate in Composition B (as described in Example 1a). The composition containing isobutyl isovalerate shall be referred to as "Composition B-2." The effectiveness of Composition B-2 was investigated by testing the gas phase of both Composition B and Composition B-2 with various plant pathogens. Applicant has found that substituting the isobutyl isobutyrate with isobutyl isovalerate increases the bioactivity of the composition in certain circumstances.

Example 9a

The bioactivity of Composition B-2 was tested for effectiveness in controlling disease progression on red seedless grapes purchased fresh in a store. Both Composition B and Composition B-2 were tested against a control (water). Composition B and Composition B-2 both contained propanoic acid, potassium isobutyrate, acid ester (isobutyl isobutyrate and isobutyl isovalerate, respectively), and benzaldehyde in a ratio of 2:5:2:2 v/w/v/v (ml/g/ml/ml). The effectiveness of Compositions B and B-2 in controlling disease progression in post harvested red seedless grapes was determined.

Solutions containing Compositions B and B-2 were tested at the 1% level, and healthy fruits (about 25) of the grapes were tested. The grapes were sprayed with each test solution (about 20 ml), and they were then placed in individual plastic containers with filter paper liners and sealed and placed at 23° C. No fungal or bacterial inocula were used in the experiment—the native flora of the grapes were relied upon as disease causing agents. Control grapes were treated with a spray of distilled water only.

After 7 days of incubation, all treated fruits were examined for necrotic spotting or generalized necrosis as well as incipient of full-fledged decay (digital images not provided herewith, but are available).

The results in the control group showed massive signs and symptoms of decay. Many fruits showed signs of fungal induced decay, fruit splitting, and 7 of the 26 fruits were soft and noticeably decayed. The container smelled of yeast fermentation of the decaying fruits. In contrast, the fruits treated with Composition B appeared relatively healthy and unaffected by any decay causing organism with a few exceptions of initial decay starting on a few fruits. However, all of the fruits in the container having fruits treated with Composition B-2 seemed healthy, not having any incipient decay and were firm and solid. In both treatments there was no sign of any necrosis that might have been caused by the treatment.

Based on the observed results, the performance of Composition B-2 as a fruit protectant was as good or better than Composition B. Furthermore, it is to be noted that the treated fruits were still edible after the treatment period under the conditions that were used in this experiment.

Example 9b

Composition B-2 was also tested on fresh store purchased early California cherries in another experiment. Comparison was again made against Composition B and a Control (water). Solutions containing Compositions B and B-2 were tested at the 1% level and healthy fruits (about 25) of the cherries were tested. The cherries were sprayed with each test solution (about 20 ml), and they were then placed in individual plastic containers with filter paper liners and sealed and placed at 23° C. No fungal or bacterial inocula were used in the experiment—the native flora of the cherries were relied upon as disease causing agents. The control cherries were treated with a spray of distilled water only.

After 7 days of incubation, all treated fruits were examined for necrotic spotting or generalized necrosis as well as incipient of full-fledged decay (digital images not provided herewith, but are available).

The results in the control group showed massive signs and symptoms of decay. Each fruit showed signs of fungal induced decay. In contrast the fruits treated with Composition B appeared relatively healthy and unaffected by decay causing organisms with a few exceptions of initial decay starting on a few fruits. However, all of the fruits in the container having fruits treated with Composition B-2 seemed healthy and not having any incipient decay. In both treatments there was no sign of any necrosis that might have been caused by the treatment.

Again, based on the observed results, the performance of Composition B-2 as a fruit protectant was as good or better than Composition B, and the treated fruits were still edible after the treatment period under the conditions that were used in this experiment.

Example 9c

Composition B-2 was also tested on freshly harvested strawberries in another experiment. Comparison was again made against Composition B and a Control (water). Solutions containing Compositions B and B-2 were tested at the 1% level and healthy fruits (about 7-8) of the strawberries were tested. The strawberries were sprayed with each test solution (about 15 ml), and they were then placed in individual plastic containers with filter paper liners and sealed and placed at 23° ° C. No fungal or bacterial inocula were used in the experiment—the native flora of the strawberries were relied upon as disease causing agents. The control strawberries were treated with a spray of distilled water only.

After 4 days of incubation, all treated fruits were examined for necrotic spotting or generalized necrosis as well as firmness and evidence of fungal hyphae and spores (digital images not provided herewith, but are available).

The results in the control group showed massive signs and symptoms of decay. Each fruit showed signs of fungal induced decay and loss of firmness along with evidence of fungal contamination (including spores and fermentation of the juices). In contrast the fruits treated with Composition B appeared relatively healthy and unaffected by decay causing organisms with the exception that three of the fruits had noticeably lost firmness. However, all of the fruits in the container having fruits treated with Composition B-2 seemed healthy, firm, and did not have signs of any incipient decay. In both treatments there was no sign of any necrosis that might have been caused by the treatment.

Again, based on the observed results, the performance of Composition B-2 as a fruit protectant was as good or better than Composition B, and the treated fruits were still edible after the treatment period under the conditions that were used in this experiment.

Example 9d

Composition B-2 was also tested on fresh store purchased green seedless grapes in another experiment. Comparison was again made against Composition B and a Control (water). Solutions containing Compositions B and B-2 were tested at the 1% level and healthy fruits (about 25) of the grapes were tested. The grapes were sprayed with each test solution (about 20 ml), and they were then placed in individual plastic containers with filter paper liners and sealed and placed at 23° C. No fungal or bacterial inocula were used in the experiment—the native flora of the grapes were relied upon as disease causing agents. The control grapes were treated with a spray of distilled water only.

After 7 days of incubation, all treated fruits were examined for necrotic spotting or generalized necrosis as well as incipient of full-fledged decay (digital images not provided herewith, but are available).

The results in the control group showed massive signs and symptoms of decay. Each fruit showed signs of decay. In contrast, the fruits treated with Composition B appeared totally healthy and unaffected by decay in contrast to the red seedless grapes of Example 9a. However, not all of the fruits in the container having fruits treated with Composition B-2 seemed healthy. Two fruits, in particular, showed signs of early decay. In both treatments there was no sign of any necrosis that might have been caused by the treatment.

In this instance, based on the observed results, the performance of Composition B as a fruit protectant was better than Composition B-2. Nonetheless, the treated fruits were still edible after the treatment period under the conditions that were used in this experiment.

Example 9e

Composition B-2 was also tested on freshly harvested blueberries in another experiment. Comparison was again made against Composition B and a Control (water). In this experiment, the manner of application was investigated. In particular, in a first test, the blueberries were sprayed with a solution containing Compositions B and B-2. In a second test, the blueberries were soaked in Compositions B and B-2 and then rinsed, and in a third test, the blueberries were soaked in Compositions B and B-2 and were not rinsed.

For the spraying test, solutions containing Compositions B and B-2 were tested at the 1% level and healthy fruits (about 30) of the blueberries were tested. The blueberries were sprayed with each test solution (about 15 ml), and they were then placed in individual plastic containers with filter paper liners and sealed and placed at 23° C. No fungal or bacterial inocula were used in the experiment—the native flora of the blueberries were relied upon as disease causing agents. The control blueberries were treated with a spray of distilled water only.

After 7 days of incubation, all treated fruits were examined for necrotic spotting or generalized necrosis as well as firmness and evidence of fungal hyphae and spores (digital images not provided herewith, but are available).

The results in the control group showed massive signs and symptoms of decay. Most of the fruits showed signs of fungal induced decay, loss of firmness, and evidence of fungal contamination (e.g., spores and evidence of fermentation). In contrast, the fruits treated with Composition B appeared relatively healthy and unaffected by decay causing organisms with the exception that two of the fruits had evidence of fungal decay. However, all of the fruits in the container having fruits treated with Composition B-2 seemed healthy, did not have any incipient decay, and were firm. In both treatments there was no sign of any necrosis that might have been caused by the treatment. The treated fruits were still edible after the treatment period under the conditions that were used in this experiment.

For the soaking test, about 30 fruits were soaked in 50 ml water alone for 10 min and then rinsed with water as a control. For the treated blueberries, a group of 30 fruits was soaked in 50 ml of Composition B for 10 min, and another group of 30 fruits was soaked in Composition B-2 for 10 min. Each group was liberally rinsed with water, and then the groups of rinsed blueberries were placed in respective containers and incubated for 7 days at room temperature. Another two group of 30 fruits were soaked in 50 ml of Compositions B and B-2, respectively, for 10 min. The groups of blueberries were removed from the soak, but were not rinsed. The soaked and unrinsed groups of blueberries were placed in respective containers and incubated for 7 days at room temperature.

The control group began to generally decay. Likewise, in both groups of berries that had been soaked in Compositions B and B-2 and rinsed, the blueberries exhibited some decay, spoiling the lot. However, the fruits soaked in Compositions B and B-2 and not rinsed only had one or two fruits in each batch that were beginning to show signs of decay. The treated berries did not exhibit any signs of treatment-induced flecking, and the fruits were edible.

Based on the spraying and soaking tests, it was determined that spraying of the fruits, with no subsequent rinsing resulted in no fruit decay after 7 days with Composition B-2. The fruits were allowed to incubate at room temperature for another 7 days, and after 14 days, the fruits sprayed with Composition B-2 still did not exhibit any signs of disease or decay. Composition B was also substantially effective at preventing decay after 7 days with only two of the fruits exhibiting decay.

The soaking followed by rinsing did not provide much protection for the fruit. The soaking without rinsing did provide acceptable levels of protection with the group of blueberries treated with Composition B-2 only having one fruit showing signs of decay.

Thus, overall, treatment with Composition B-2 offered good protection against decay with the spray treatment providing the best protection followed by soaking without rinse.

Example 9f

Composition B-2 was also tested on fresh store purchased sugar peas in another experiment. Comparison was again made against Composition B and a Control (water). Solutions containing Compositions B and B-2 were tested at the 1% level and healthy fruits (about 10) of the sugar peas were tested. The sugar peas were sprayed with each test solution (about ml), and they were then placed in individual plastic containers with filter paper liners and sealed and placed at 23° C. No fungal or bacterial inocula were used in the experiment—the native flora of the sugar peas were relied upon as disease causing agents. The control sugar peas were treated with a spray of distilled water only.

After 7 days of incubation, all treated fruits were examined for signs or symptoms of decay (digital images not provided herewith, but are available).

The results in the control group showed massive signs and symptoms of fungal induced decay. In particular, all of the peas of the control group showed symptoms and signs of fungal induced decay including the growth of fungal hyphae and the decay of the sugar peas. Further, the container smelled of fungal fermentation of the decaying sugar peas. In contrast, the fruits treated with Composition B appeared relatively healthy except for one fruit sporting some fungal growth. On the other hand, sugar peas treated with formula B-2 showed the presence of fungal growth (whitish mycelium on the peas) with some incipient decay.

In this instance, based on the observed results, the performance of Composition B as a fruit protectant was better than Composition B-2.

Example 10

The antimicrobial compositions, such as Composition B and Composition B-2, can be concentrated into an antimicrobial solution for storage. In embodiments, the concentrate is prepared by dissolving the $C_4$ acid salt and, optionally ascorbic acid crystals, in water to form a first mixture. In an embodiment, the first mixture comprises 5% to 15% by weight of a $C_4$ acid salt, 0% to 20% by weight of ascorbic acid crystals, and 70% to 95% by weight of water. In a second mixture, glycerol, water, ethanol, and liquid lecithin are combined, mixing to ensure solubilization of the lecithin. In an embodiment, the second mixture comprises 37% to 42% by weight of glycerol, 20% to 25% by weight of water, 30% to 35% by weight of ethanol, and 2% to 7% by weight of lecithin. In a third mixture, the propanoic acid, $C_2$-$C_5$ acid ester, and $C_2$-$C_8$ aldehyde are mixed. In an embodiment, the third mixture comprises 32% to 37% by weight of propanoic acid, 27% to 32% by weight of $C_2$-$C_5$ acid ester, and 33% to 38% of $C_2$-$C_8$ aldehyde. The third mixture is then mixed with the second mixture, stirring well to combine. The first mixture is then added slowly while stirring until well-mixed. The resultant mixture is biologically very active and can be easily stored. In an embodiment, the concentrated antimicrobial solution comprises 37% to 42% by weight of the first mixture, 55% to 60% by weight of the second mixture, and 2% to 5% by weight of the third mixture, which provides a concentration of about 5% to 10% by weight of the antimicrobial composition within the solution. In embodiments, the concentrated antimicrobial solution comprises the antimicrobial composition and a liquid medium. Within the antimicrobial solution, the antimicrobial composition comprise 5% to 10% by weight of the antimicrobial composition, 0% to 5% by weight of the ascorbic acid crystals, 20% to 25% by weight of glycerol, 17% to 22% by weight of ethanol, 0.5% to 5% by weight of liquid lecithin, and the balance of water.

The concentrate can be prepared for Composition B according to the following specific procedure. In a first step, 0.5 g of potassium isobutyrate and optionally 1 g ascorbic acid crystals were dissolved in 5 ml of water. In a second step, a separate mixture is prepared containing 3 ml of glycerol, 2 ml of water, 4 ml of ethanol, and about 0.35 g of liquid lecithin. The mixture in the second step is mixed well to ensure that the liquid lecithin is solubilized. In a third step, 0.2 ml of propanoic acid, 0.2 ml of isobutyl isobutyrate, and 0.2 ml of benzaldehyde are mixed. The mixture from the third step is mixed with the mixture of the second step and stirred well. The mixture of the first step is then slowly added while stirring. The resulting solution has a volume of about 15 ml and contained 6.6% by weight of composition B. Advantageously, the concentrated solution and ingredients are natural and generally recognized as safe.

Example 11

Powdery mildews are among of the most common diseases of ornamentals; many flowers, vegetables, and woody plants are susceptible. Greenhouse crops prone to infection include African violet, *Begonia*, Dahlia, *gerbera* daisy, *Hydrangea*, roses, *Verbena*, *Kalanchoe*, and *Poinsettia*. Herbaceous perennials particularly susceptible to powdery mildew include Aster, *Centaurea, Coreopsis, Delphinium, Monarda, Phlox, Rudebeckia, Begonia*, and *Sedum*. Most crop plants, including cereals and most fruit species, are also hosts for the powdery mildew species.

The disease is easily recognizable as a white to gray powdery growth on leaves and sometimes stems and flowers. It is usually most severe on the tops of leaves, but can appear on the undersides as well Mild cases of powdery mildew may have little or no effect on the plant other than diminishing its aesthetic value, but in other instances, infected leaves may become distorted, discolored, and die prematurely. In general, powdery mildews have evolved to avoid killing their hosts because they need living plant tissue in order to survive. Symptoms and their severity depend upon the cultivar or species of host plant, the powdery mildew species, environmental conditions, and the age of plant tissue when it first became infected *Sedum* develops brown scabby spots that can be mistaken for a leaf spot disease or spray injury.

Powdery mildew diseases are caused by fungi in several genera, including Erisyphe, *Leveillula, Golovinomyces, Podosphaera*, and *Sphaerotheca*. Each genus contains several species. Most powdery mildew species are specialized to infect only hosts in one plant genus or one family, and it is rare that more than one family is effected by a single species. For example, Erisyphe has a wide host range and can infect many plants in the Asteraceae family, while *Sphaerotheca pannosa* var. *rosae* is confined to roses. An exception to the rule is *Podosphaera xanthii*, which infects *Calibrachoa, Verbena*, and *petunia*, and also infects cucurbits (pumpkins, squash, melon, and cucumber). In this case, it is important to avoid growing squash and cucumber transplants in the same greenhouse as susceptible *verbena* or *calibrachoa*.

The distinctive whitish powder on leaves is composed of fine threads of fungal vegetative tissue (mycelium) and light colored mats of asexual spores (conidia), and it represents the imperfect stage of the fungus, *Oidium* sp. These spores are easily moved by air movement and water splash. Because powdery mildews are obligate parasites, they do not require plant stress or injury to infect plants. When spores land upon a susceptible host, they germinate and send a specialized feeding structure into the epidermis and obtain their nutrients from the plants. The infection process may take as little as 3 days or as long as 7 days. The pathogen survives in the greenhouse in weed hosts or on crops. Outdoors, the pathogen can overwinter as mycelium in infected plant parts or in resting structures (chasmothecia) produced by sexual means and visible as small, dark specks on dying leaves.

Powdery mildews, unlike most other fungal diseases, do not need free water to germinate and infect. They are favored by high relative humidity (greater than 95%), moderate temperatures (68° F.-86° F.), and low light intensities. These diseases are more prevalent in the spring and fall when large differences between day and night temperatures occur. Temperatures above 90° F. kill some powdery mildew fungi and spores, and the presence of free water can reduce spore germination.

Because Compositions B and B-2 have been demonstrated in the foregoing examples as being effective against many plant pathogens, it was believed that these compositions could also be effective against mildews. In the following discussion, Compositions B and B-2 were examined for their effectiveness against the mildew organism on begonias heavily infected with powdery mildew, Oidium sp.

Heavily infected Begonia leaves were mist sprayed with 5 ml of a 1% solution of Composition B, and other leaves were sprayed with 5 ml of a 1% solution of Composition B-2. Each leaf sprayed received a spray of about 2 ml to a point that the leaf was entirely wetted. The leaves were examined at 1, 2, 3, and up to 7 days post treatment. These treatments were also applied to the flowers of Begonia in order to determine any effect that Compositions B and B-2 would have on the flowers. Digital images were taken over the course of the treatment. Such images are not provided herewith but are available.

In both treatment cases, the Begonia leaves treated with Compositions B and B-2 showed some control of 70-80% of the mildew disease well after the formulae were applied to the leaves. Composition B-2 seemed to be slightly more effective than Composition B in the diminution of disease symptoms. No detrimental effect of Compositions B and B-2 on the flowers of the Begonia was noticed, which is important for maintain the aesthetic value of the plant. Advantageously, the initial clearance of the symptoms remained up to a week after spraying with both Compositions B and B-2 (although, dead hyphae and spores remained visible), and symptoms were gone within 24 hours with no new leaf infections. In view of lower acidity (higher pH) and the use of natural ingredients that are generally recognized as safe, it is believed that the antimicrobial compositions disclosed herein may be effective fungicides treatment of crops and ornamental plants. Use of a sticking agent or with a rhamnolipid biosurfactant (e.g., Zonix™ available from Jeneil Biosurfactant Company, LLC, Saukville, WI) may facilitate dispersal and spread of the compositions.

Example 12

Another potential application of the disclosed antimicrobial compositions is to delay the progression of browning of meat. In order to investigate the effectiveness in this application, fresh sirloin was cut into 0.5 inch thick slices that were about 2×3 inches in size. To one slice, 0.3 ml of water was applied with spreading action over the entire surface. To another slice, 0.3 ml of the concentrate of Example 10 was applied with spreading action over the entire surface. In particular, the concentrate consisted of 1 g ascorbic acid crystals, 0.5 g of potassium isobutyrate, 0.35 g of liquid lecithin, 7 ml total of water, 4 ml of ethanol, 3 ml of glycerol, 0.2 ml of propanoic acid, 0.2 ml of isobutyl isobutyrate, and 0.2 ml of benzaldehyde for a total volume of about 15 ml at 6.6% concentration of composition B. The concentrate was prepared according to the method outlined in Example 10. Another piece of meat was covered with a Kimwipe saturated with 0.2 ml of water, and still another piece of meat was covered with a Kimwipe saturated with 0.2 ml of the concentrate of Example 10. All pieces were incubated at 40° F. for 5 days (digital images not provided herewith, but available).

From visual inspection of the first two slices, it could be seen that the treated specimen remained free of the oxidation processes that normally turn meats brownish as per the control samples. Samples were taken of the meat specimens covered by the Kimwipes and streaked on PDA to provide an indication of the microbial load. The bacterial load for the treated specimen as significantly reduced as seen on the PDA plate compared to the control sample after 1 day incubation on the Petri plate with PDA. It is believed that even better results could be achieved if a light gauze material or cotton mesh cloth were used instead of a Kimwipe.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A composition comprising propanoic acid, a $C_4$ acid salt and a component selected from a $C_2$-$C_5$ acid ester and a $C_2$-$C_8$ aldehyde and combinations thereof, said composition in an aqueous medium and said composition comprising a pH greater than about 4.4.

2. The composition of claim 1 wherein said ester is selected from esters of a $C_4$ or $C_5$ acid and combinations thereof.

3. The composition of claim 2 wherein said ester is selected from esters of isobutyric acid, isovaleric acid, and combinations thereof.

4. The composition of claim 3 wherein said ester is isobutyl isobutyrate or isobutyl isovalerate.

5. The composition of claim 2 wherein said aldehyde is benzaldehyde.

6. The composition of claim 5 wherein said acid salt is selected from salts of isobutyric acid and combinations thereof.

7. The composition of claim 6 wherein said acid salt is selected from potassium and ammonium salts of isobutyric acid.

8. The composition of claim 1 wherein said pH is about 4.7 to about 5.4.

9. A composition comprising propanoic acid, a salt of isobutyric acid, a $C_2$-$C_5$ acid ester and a $C_2$-$C_8$ aldehyde, said composition in an aqueous medium, said propanoic acid present at a ratio of about 4:3 (v/w) to about 1:6 (v/w) with respect to said salt of isobutyric acid.

10. The composition of claim 9 wherein said salt is selected from potassium and ammonium salts of isobutyric acid.

11. The composition of claim 10 wherein said ester is selected from esters of a $C_4$ or $C_5$ acid and combinations thereof.

12. The composition of claim 11 wherein said ester is selected from esters of isobutyric acid, isovaleric acid, and combinations thereof.

13. The composition of claim 12 wherein said ester is isobutyl isobutyrate or isobutyl isovalerate.

14. The composition of claim 11 wherein said aldehyde is benzaldehyde.

15. A composition comprising propanoic acid, a salt of isobutyric acid, a $C_2$-$C_5$ acid ester and a flavor component selected from benzaldehyde, octyl acetate, gamma-decalactone and methyl anthranilate, said composition in an aqueous medium, said propanoic acid present at a ratio of about 4:3 (v/w) to about 1:6 (v/w) with respect to said salt of isobutyric acid.

16. The composition of claim 15 wherein said salt of isobutyric acid is potassium isobutyrate, and said ratio is about 3:4 (v/w) to about 2:5 (v/w).

17. The composition of claim 15 wherein said flavor component is benzaldehyde.

18. The composition of claim 17 applied to one of a cherry and a composition selected from cherry juices, cherry nectars and cherry concentrates.

19. The composition of claim 15 wherein said flavor component is octyl acetate.

20. The composition of claim 19 applied to one of an orange and a composition selected from orange juices, orange nectars and orange concentrates.

21. The composition of claim 15 wherein said flavor component is gamma-decalactone.

22. The composition of claim 21 applied to one of a peach and a composition selected from peach juices, peach nectars and peach concentrates.

23. The composition of claim 15 wherein said flavor component is methyl anthranilate.

24. The composition of claim 23 applied to one of a grape and a composition selected from grape juices, grape nectars and grape concentrates.

25. The composition of claim 15 wherein the aqueous medium comprises the composition at a concentration of about 0.06 vol. % to about 0.1 vol. %.

* * * * *